(12) United States Patent
Chen et al.

(10) Patent No.: US 12,466,439 B2
(45) Date of Patent: Nov. 11, 2025

(54) VEHICLE CONTROL APPARATUS AND VEHICLE CONTROL METHOD

(71) Applicant: TOYOTA JIDOSHA KABUSHIKI KAISHA, Aichi (JP)

(72) Inventors: Xi Chen, Nagoya (JP); Kazuya Okamoto, Toyota (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 170 days.

(21) Appl. No.: 18/228,626

(22) Filed: Jul. 31, 2023

(65) Prior Publication Data

US 2024/0034357 A1 Feb. 1, 2024

(30) Foreign Application Priority Data

Aug. 1, 2022 (JP) ................................. 2022-122486

(51) Int. Cl.
*B60W 60/00* (2020.01)
*B60W 30/085* (2012.01)
*B60W 30/09* (2012.01)

(52) U.S. Cl.
CPC ...... *B60W 60/0016* (2020.02); *B60W 30/085* (2013.01); *B60W 30/09* (2013.01); *B60W 60/00272* (2020.02)

(58) Field of Classification Search
CPC .............. B60W 30/09; B60W 30/095; B60W 30/0956; B60W 2420/408; B60W 2420/403; B60W 10/20; B60W 10/18; B60W 2556/20; B60W 50/0097; B60W 2554/20; B60W 2554/40; B60W 2556/35; B60W 60/0016; B60W 30/085; B60W 60/00272; B60W 2554/805; B60W 50/00; B60W 2050/0002; G01S 13/881; G01S 13/931; G01S 13/867; G01S 2013/9318; G01S 2013/93185; G01S 2013/93271; G01S 13/87; G01S 2013/93274; G01S 13/04; G01S 13/06; G01S 2013/9315;
(Continued)

(56) References Cited

U.S. PATENT DOCUMENTS 9,105,190 B2   8/2015  Akiyama
9,393,960 B2   7/2016  Kodaira
9,483,945 B2   11/2016 Okita et al.
(Continued)

FOREIGN PATENT DOCUMENTS

JP   2020012702 A   1/2020
JP   2022090833 A   6/2022

*Primary Examiner* — Abby Lin
*Assistant Examiner* — Kayla R. Doros
(74) *Attorney, Agent, or Firm* — HAUPTMAN HAM, LLP

(57) ABSTRACT

A vehicle control apparatus performs a front collision avoidance control when the frontward object satisfies a predetermined front collision condition, and performs a side collision avoidance control when the sideward object satisfies a predetermined side collision condition. The vehicle control apparatus suppresses performing the side collision avoidance control in a case where the sideward object is located in an overlapping area between a sideward detection area and a frontward detection area, as compared to a case where the sideward object is located in a non-overlapping area that is a rest of the sideward detection area other than the overlapping area.

7 Claims, 11 Drawing Sheets

(58) Field of Classification Search
CPC ........ G06V 20/58; G06V 20/56; G06V 10/16; G08G 1/16; G08G 1/166
See application file for complete search history.

(56) References Cited

U.S. PATENT DOCUMENTS

| | | | |
|---|---|---|---|
| 9,873,412 B2 | 1/2018 | Moriizumi | |
| 10,793,147 B2 | 10/2020 | Kaminade et al. | |
| 2015/0109164 A1* | 4/2015 | Takaki | G01S 13/931 |
| | | | 342/27 |
| 2016/0288799 A1* | 10/2016 | Nguyen Van | G01S 13/931 |
| 2017/0001637 A1* | 1/2017 | Nguyen Van | G01S 13/87 |
| 2020/0226930 A1* | 7/2020 | Shimbo | G06V 20/58 |
| 2020/0320728 A1* | 10/2020 | Tsunashima | G01C 11/14 |
| 2021/0061309 A1 | 3/2021 | Kawanai | |
| 2021/0089843 A1* | 3/2021 | Mizoguchi | G06V 10/22 |
| 2021/0107521 A1 | 4/2021 | Fujita et al. | |
| 2021/0107528 A1 | 4/2021 | Fujita et al. | |
| 2021/0146956 A1 | 5/2021 | Fujita et al. | |
| 2021/0146958 A1 | 5/2021 | Tanaka et al. | |
| 2021/0316723 A1* | 10/2021 | Yamakawa | G01S 7/415 |
| 2022/0063655 A1* | 3/2022 | Clasen | G01S 13/878 |
| 2022/0176982 A1 | 6/2022 | Kakeshita et al. | |

* cited by examiner

VEHICLE CONTROL APPARATUS AND VEHICLE CONTROL METHOD

RELATED APPLICATIONS

The present application claims priority to Japanese Patent Application No. 2022-122486, filed Aug. 1, 2022, the disclosure of which is hereby incorporated by reference herein in its entirety.

TECHNICAL FIELD

The present disclosure relates to a vehicle control apparatus configured to perform a collision avoidance control to avoid a collision between an object and a vehicle or to mitigate a damage caused by the collision, and a vehicle control method for performing the collision avoidance control using a computer of the vehicle.

BACKGROUND

There has been a known vehicle control apparatus configured to perform a collision avoidance control that is one kind of autonomous driving controls.

For example, a vehicle control apparatus (hereinafter, referred to as a "first conventional apparatus") disclosed in Japanese Patent Application Laid-Open No. 2020-12702 is configured to perform a collision avoidance control when a "moving object that is present in a side area of a vehicle" detected by a radar sensor satisfies a collision condition. This collision avoidance control is referred to as a "side collision avoidance control".

The radar sensor of the first conventional apparatus is configured to transmit a millimeter wave (transmitted wave) toward the side of the vehicle, and to receive a "reflected wave". The transmitted wave is reflected at a reflection point of an object so as to generate the reflected wave. The radar sensor recognizes the object (i.e., the radar sensor specifies/obtains a position of the object with respect to the vehicle and a relative speed of the object to the vehicle) based on the transmitted wave and the reflected wave.

Another vehicle control apparatus (hereinafter, referred to as a "second conventional apparatus") disclosed in Japanese Patent Application Laid-Open No. 2022-90833 is configured to perform a collision avoidance control when it detects an object in front of a vehicle, and the object satisfies a collision condition. This collision avoidance control is referred to as a "front collision avoidance control".

The second conventional apparatus recognizes an object by fusing "first detection information on an object detected by a camera" with "second information on an object detected by the radar sensor". Namely, the second conventional apparatus obtains a position of the object with respect to the vehicle and a relative speed of the object to the vehicle, based on both the first information and the second information (refer to paragraphs [0050]-[0052] of Japanese Patent Application Laid-Open No. 2022-90833).

SUMMARY

The first conventional apparatus recognizes the object using the information obtained by the radar sensor only. The second conventional apparatus recognizes the object using the information obtained by both of the camera and the radar sensor. Therefore, recognition accuracy regarding the object in the first conventional apparatus is lower than recognition accuracy regarding the object in the second conventional apparatus.

Meanwhile, the inventors of the present disclosure have been studying/developing a vehicle control apparatus (hereinafter, referred to as a "prototype apparatus").

The prototype apparatus is configured to recognize an object that is present/located in a side area of the vehicle using information obtained by a sideward radar sensor, and an object that is present/located in front of the vehicle based on information obtained by a camera and a frontward radar sensor. Thus, recognition accuracy regarding the object that is present in the side area of the vehicle is lower than recognition accuracy regarding the object that is present in front of the vehicle. Therefore, a possibility that the prototype apparatus erroneously performs the side collision avoidance control is higher than a possibility that the prototype apparatus erroneously performs the front collision avoidance control.

It is likely that "an operator (i.e., a driver or an remote vehicle operator) and a passenger" of the vehicle feel annoyed at the thus erroneously performed side collision avoidance.

The present disclosure is made to cope with the problem described above. That is, one of objectives of the present disclosure is to provide a vehicle control apparatus that can decrease a possibility that the operator and the passenger feel annoyed at the side collision avoidance control by reducing a possibility that the side collision avoidance control is erroneously performed.

A vehicle control apparatus (hereinafter, referred to as a present disclosure apparatus") according to an embodiment of the present disclosure comprises:

a frontward detection section (22, 26, 20) configured to detect, as a frontward object, an object that is located/present in a frontward detection area (FR) that is an area in front of a vehicle (VA);

a sideward detection section (24L, 24R, 20) configured to detect, as a sideward object, an object that is located/present in a sideward detection area (SR) that is a side area of the vehicle, the sideward detection area having an overlapping area (OR) that is a part of the sideward detection area that overlaps with the frontward detection area; and a control section (20, 30, 40, 50) configured to perform a front collision avoidance control to avoid a collision between the frontward object and the vehicle or to mitigate a damage caused by the collision between the frontward object and the vehicle, when the frontward object satisfies a predetermined front collision condition; and configured to perform a side collision avoidance control to avoid a collision between the sideward object and the vehicle or to mitigate a damage caused by the collision between the sideward object and the vehicle, when the sideward object satisfies a predetermined side collision condition, wherein, recognition accuracy regarding the sideward object of the sideward detection section is lower than recognition accuracy regarding the frontward object of the frontward detection section; and the control section is configured to suppress performing the side collision avoidance control in a case where the sideward object is located/present in the overlapping area, as compared to a case where the sideward object is located/present in a non-overlapping area (ER) that is a rest of the sideward detection area other than the overlapping area (step 920, step 925, step 930).

The present disclosure apparatus suppresses performing the side collision avoidance control in a case where the sideward object is located in the overlapping area, as compared to a case where the sideward object is located in the non-overlapping area. Therefore, when the sideward object is located in the overlapping area, performing the side collision avoidance control based on a detection result of the sideward detection section whose recognition accuracy regarding the (sideward) object is relatively low can be suppressed. This can decrease a possibility that the side collision avoidance control is erroneously performed. Whereas, when an object having a high possibility of colliding with the vehicle is located in the overlapping area, the front collision avoidance control based on a detection result of the frontward detection section whose recognition accuracy regarding the (frontward) object is relatively high is performed. This enables the collision avoidance control (front collision avoidance control) to be performed without fail.

In some embodiments,
the control section is configured to:
  obtain a reliability degree (RD) representing a possibility that the sideward object detected by the sideward detection section is actually located/present (step 910, step 915, step 935, step 945, step 950, step 955, step 960);
  perform the side collision avoidance control (step 850, step 1015, step 1020) if the reliability degree of the sideward object is equal to or greater than a predetermined reliability degree threshold (step 845: Yes), when the sideward object satisfies the side collision condition (step 840: Yes); and
  set an upper limit of the reliability degree of the sideward object that is located/present in the overlapping area to a value smaller than a value of an upper limit of the reliability degree of the sideward object that is located/present in the non-overlapping area (step 920: Yes, step 925).

According to the above embodiment, the upper limit of the reliability degree of the sideward object that is located in the overlapping area is set to a value smaller than a value of the upper limit of the reliability degree of the sideward object that is located in the non-overlapping area. Therefore, the reliability degree of the sideward object that is located in the overlapping area tends not to be equal to or greater than the reliability threshold as compared to the reliability degree of the sideward object that is located in the non-overlapping area. Thus, performing the side collision avoidance control is suppressed when the sideward object is located in the overlapping area, as compared to when the sideward object is located in the non-overlapping area.

In some embodiments,
the control section is configured to:
  perform the front collision avoidance control when the frontward object satisfies the front collision condition, regardless of whether or not the frontward object is moving (step 740); and
  perform the side collision avoidance control when the sideward object is moving (step 825) and the sideward object satisfies the collision condition.

For an object that is located in the overlapping area, there is a possibility that both of the front collision avoidance control and the side collision avoidance control are performed. Here, the side collision avoidance control is supposed to be unperformed if the sideward object is stationary, however, the sideward detection section may erroneously determine that a stationary object is a moving object since the recognition accuracy regarding the sideward object of the sideward detection section is lower than the recognition accuracy regarding the frontward object of the frontward detection section. This erroneous determination causes the side collision avoidance control to be erroneously performed for the stationary object. In view of this, as described above, performing the side collision avoidance control is suppressed when the sideward object is located in the overlapping area, as compared to when the sideward object is located in the non-overlapping area. Thus, a possibility that the side collision avoidance control is erroneously performed for the stationary object that is located in the overlapping area can be decreased.

In the above embodiment,
  the frontward detection section and the sideward detection section are configured to have the overlapping area in such a manner that the overlapping area is an area where an erroneously determined object that is located in the overlapping area has a possibility of colliding with the vehicle, the erroneously determined object being an object having a possibility that it is erroneously determined to be moving although it is stationary, and in such a manner that the non-overlapping area is an area where the erroneously determined object that is located in the non-overlapping area does not have a possibility of colliding with the vehicle (refer to FIG. 6).

According to the above embodiment, the overlapping area has been set in such a manner that the overlapping area is an area where an erroneously determined object that is located in the overlapping area has a possibility of colliding with the vehicle. The erroneously determined object is an object having a possibility that it is erroneously determined to be moving although it is stationary. In addition, the non-overlapping area has been set in such a manner that the erroneously determined object that is located in the non-overlapping area does not have a possibility of colliding with the vehicle.

Therefore, even when the erroneously determined object is located in the non-overlapping area of the sideward detection area, the erroneously determined object is very unlikely to collide with the vehicle. Thus, it is very unlikely that the side collision avoidance control is erroneously performed. Whereas, when the erroneously determined object is located in the overlapping area, the erroneously determined object has a possibility of colliding with the vehicle, and therefore, the side collision avoidance control may be erroneously performed. However, as described above, performing the side collision avoidance control is suppressed in a case where the sideward object is located in the overlapping area, as compared to a case where the sideward object is located in the non-overlapping area. Therefore, a possibility that the side collision avoidance control is erroneously performed for the stationary object that is located in the overlapping area can be decreased.

It should be noted that, although performing the side collision avoidance control is suppressed in a case where the sideward object is located in the overlapping area, the front collision avoidance control is performed when there is a high possibility that an object that is located in the overlapping area collides with the vehicle.

In the above embodiment,
  the frontward detection area has been determined/set in such a manner that the frontward detection area has 45 degrees leftward from a center axis and has 45 degrees rightward from the center axis, the center axis extending frontward along/in a front-rear axis direction of the vehicle and passing through a center position in a vehicle width direction of the vehicle (refer to FIG. 6).

As the vehicle moves, the stationary object is seen from the vehicle as if the stationary object is moving. A magnitude of a front-rear axis direction component of a relative speed of the stationary object to the vehicle is equal to a magnitude of a vehicle speed indicative of a speed of the vehicle. It should be noted that the front-rear axis direction component means a component of the relative speed in the front-rear direction of the vehicle.

For example, in a case where the sideward object is a guardrail that is the stationary object, and when the front-rear axis of the vehicle is oblique to the guardrail, a relative speed of the guardrail includes a component (vehicle width direction component) in the vehicle width direction. A magnitude of the vehicle width direction component is never greater than the magnitude of the front-rear axis direction component (i.e., the magnitude of the vehicle speed). This is because an angle formed between a relative moving direction of the stationary object with respect to the vehicle and the front-rear axis direction of the vehicle is 45 degrees at a maximum (i.e., the above-described angle becomes largest when the front-rear axis direction of the vehicle is orthogonal to the guardrail), and thus, in this case, the magnitude of the vehicle width direction component of the stationary object is the same as the magnitude of the front-rear axis direction component.

Thus, when the stationary object having the maximum formed angle is in an area having 45 degrees leftward from the front-rear axis direction of the vehicle and having 45 degrees rightward from the front-rear axis direction of the vehicle, an extended line of the relative movement direction intersects with the front-rear axis of the vehicle at the center position of a front end of the vehicle so that there is a possibility that the stationary object collides with the vehicle.

As described above, since the magnitude of the vehicle width direction component is equal to or smaller than the magnitude of the vehicle speed, the above-described relative moving direction is equal to or smaller than 45 degrees leftward or rightward around the front-rear axis direction of the vehicle.

In the present example, the frontward detection area has been determined/set in such a manner that the frontward detection area has 45 degrees leftward and rightward, respectively, from the front-rear axis direction passing through the center position in the vehicle width direction. Therefore, the overlapping area is an area that has been set in such a manner that the erroneously determined object that is located in the overlapping area has a possibility of colliding with the vehicle.

In some embodiments,
the control section is configured to:
determine that the front collision condition becomes satisfied, when a relationship between a front collision indication value indicative of a possibility of a collision between the frontward object and the vehicle and a predetermined frontward threshold satisfies a predetermined condition (step 740: Yes); and
determine that the side collision condition becomes satisfied, when a relationship between a side collision indication value indicative of a possibility of a collision between the sideward object and the vehicle and a predetermined sideward threshold satisfies a predetermined condition (step 840: Yes).

According to the above embodiment, the front collision avoidance control is performed when the relationship between the front collision indication value and the frontward threshold satisfies the predetermined condition; and the side collision avoidance control is performed when the relationship between the side collision indication value and the sideward threshold satisfies the predetermined condition. This can cause the front collision avoidance control to be performed when the possibility that the frontward object collides with the vehicle becomes high, and can cause the side collision avoidance control to be performed when the possibility that the sideward object collides with the vehicle becomes high.

In some embodiments,
the frontward detection section includes a camera (26) and a first radar sensor (22), and is configured to recognize the frontward object based on (both of) an image taken by the camera and a detection result of the first radar sensor (step 720); and
the sideward detection section includes a second radar sensor (24L, 24R), and is configured to recognize the sideward object based (solely) on a detection result of the second radar sensor (step 815).

According to the above embodiment, the frontward detection section recognizes the frontward object based on the image taken by the camera as well as the detection result of the first radar sensor, whereas, the sideward detection section recognizes the sideward object based solely on the detection result of the second radar sensor. Therefore, the recognition accuracy regarding an object of the sideward detection section is lower than the recognition accuracy regarding an object of the frontward detection section.

A vehicle control method according to an embodiment of the present disclosure is a method to perform a collision avoidance control to avoid a collision between an object and a vehicle (VA) or to mitigate a damage caused by the collision. The vehicle control method is executed (carried out) by a computer/processor (20) installed on (mounted on) the vehicle (VA).

The vehicle control method comprises:
a first step (step 720) of recognizing a frontward object based on a detection result of a frontward detection section (22, 26) that detects, as the frontward object, an object that is located in a frontward detection area (FR) that is an area in front of the vehicle;
a second step (step 815) of recognizing a sideward object based on a detection result of a sideward detection section (24L, 24R) that detects, as the sideward object, an object that is located in a sideward detection area (SR) that is a side area of the vehicle, the sideward detection area having an overlapping area (OR) that is a part of the sideward detection area that overlaps with the frontward detection area;
a third step (step 1015, step 1020) of performing a front collision avoidance control to avoid a collision between the frontward object and the vehicle or to mitigate a damage caused by the collision between the frontward object and the vehicle, when the frontward object satisfies a predetermined front collision condition (step 740: Yes); and
a fourth step (step 1015, step 1020) of performing a side collision avoidance control to avoid a collision between the sideward object and the vehicle or to mitigate a damage caused by the collision between the sideward object and the vehicle, when the sideward object satisfies a predetermined side collision condition (step 840: Yes).

Recognition accuracy regarding the sideward object of the sideward detection section is lower than recognition accuracy regarding the frontward object of the frontward detection section;

The vehicle control method further comprises a fifth step (step 920, step 925, step 930) of suppressing performing the side collision avoidance control in a case where the sideward object is located in the overlapping area, as compared to a case where the sideward object is located in a non-overlapping area (ER) that is a rest of the sideward detection area other than the overlapping area.

A program storage device according to an embodiment of the present disclosure is a storage device that is readable by machine and stores a program for causing a computer/processor (20) installed on (mounted on) a vehicle (VA) to perform a collision avoidance control to avoid a collision between an object and the vehicle or to mitigate a damage caused by the collision.

The program causes the computer to implement processes of:
 a first step (step 720) of recognizing a frontward object based on a detection result of a frontward detection section (22, 26) that detects, as the frontward object, an object that is located in a frontward detection area (FR) that is an area in front of the vehicle;
 a second step (step 815) of recognizing a sideward object based on a detection result of a sideward detection section (24L, 24R) that detects, as the sideward object, an object that is located in a sideward detection area (SR) that is a side area of the vehicle, the sideward detection area having an overlapping area (OR) that is a part of the sideward detection area that overlaps with the frontward detection area;
 a third step (step 1015, step 1020) of performing a front collision avoidance control to avoid a collision between the frontward object and the vehicle or to mitigate a damage caused by the collision between the frontward object and the vehicle, when the frontward object satisfies a predetermined front collision condition (step 740; Yes); and
 a fourth step (step 1015, step 1020) of performing a side collision avoidance control to avoid a collision between the sideward object and the vehicle or to mitigate a damage caused by the collision between the sideward object and the vehicle, when the sideward object satisfies a predetermined side collision condition (step 840: Yes).

Recognition accuracy regarding the sideward object of the sideward detection section is lower than recognition accuracy regarding the frontward object of the frontward detection section.

The program further causes the computer to implement a process of a fifth step (step 920, step 925, step 930) of suppressing performing the side collision avoidance control in a case where the sideward object is located in the overlapping area, as compared to a case where the sideward object is located in a non-overlapping area (ER) that is a rest of the sideward detection area other than the overlapping area.

According to the above embodiments, when the sideward object is located in the overlapping area, performing the side collision avoidance control based on a detection result of the sideward detection section whose recognition accuracy regarding the (sideward) object is relatively low can be suppressed, and therefore, a possibility that the side collision avoidance control is erroneously performed can be decreased.

One embodiment of the present disclosure is a vehicle control apparatus comprising:
 a sideward detection section (24L, 24R) configured to detect a sideward object that is located in a side are of the vehicle; and
 a control section (20, 30, 40, 50) configured to perform a side collision avoidance control to avoid a collision between the sideward object and the vehicle or to mitigate a damage caused by the collision between the sideward object and the vehicle, when the sideward object satisfies a predetermined side collision condition,
wherein,
the control section is configured:
 to perform the side collision avoidance control, in a case where a magnitude of a vehicle width direction component (Vrx) of the sideward object is larger than a magnitude of a vehicle speed indicative of a speed of the vehicle (step 1105: Yes) and the sideward object satisfies the side collision condition (step 840 shown in FIG. 11: Yes), wherein the vehicle width direction component is a component in the vehicle width direction of a relative speed of the sideward object relative to the vehicle; and
 not to perform the side collision avoidance control, in a case where the magnitude of the vehicle width direction component is equal to or smaller than the magnitude of the vehicle speed (step 1105: No).

As described above, the magnitude of the vehicle width direction component of the relative speed of the object that is erroneously determined to be moving although the object is actually stationary is equal to or smaller than the magnitude of the vehicle speed. The above embodiment does not perform the side collision avoidance control, when the magnitude of the vehicle width direction component of the relative speed of the object is equal to or smaller than the magnitude of the vehicle speed. This can decrease a possibility that the side collision avoidance control is erroneously performed for the object that is erroneously determined to be moving although the object is actually stationary.

Notably, in the above description, in order to facilitate understanding of the present disclosure, the constituent elements or the like of the disclosure corresponding to those of the embodiments of the disclosure which will be described later are accompanied by parenthesized names and/or symbols which are used in the embodiments. However, the constituent elements of the disclosure should not be limited to those in the embodiments defined by the names and/or the symbols.

Other objects, other features, and attendant advantages of the present disclosure will be readily appreciated from the following description of the embodiment of the disclosure which is made with reference to the accompanying drawings.

DETAILED DESCRIPTION

Figure 1:
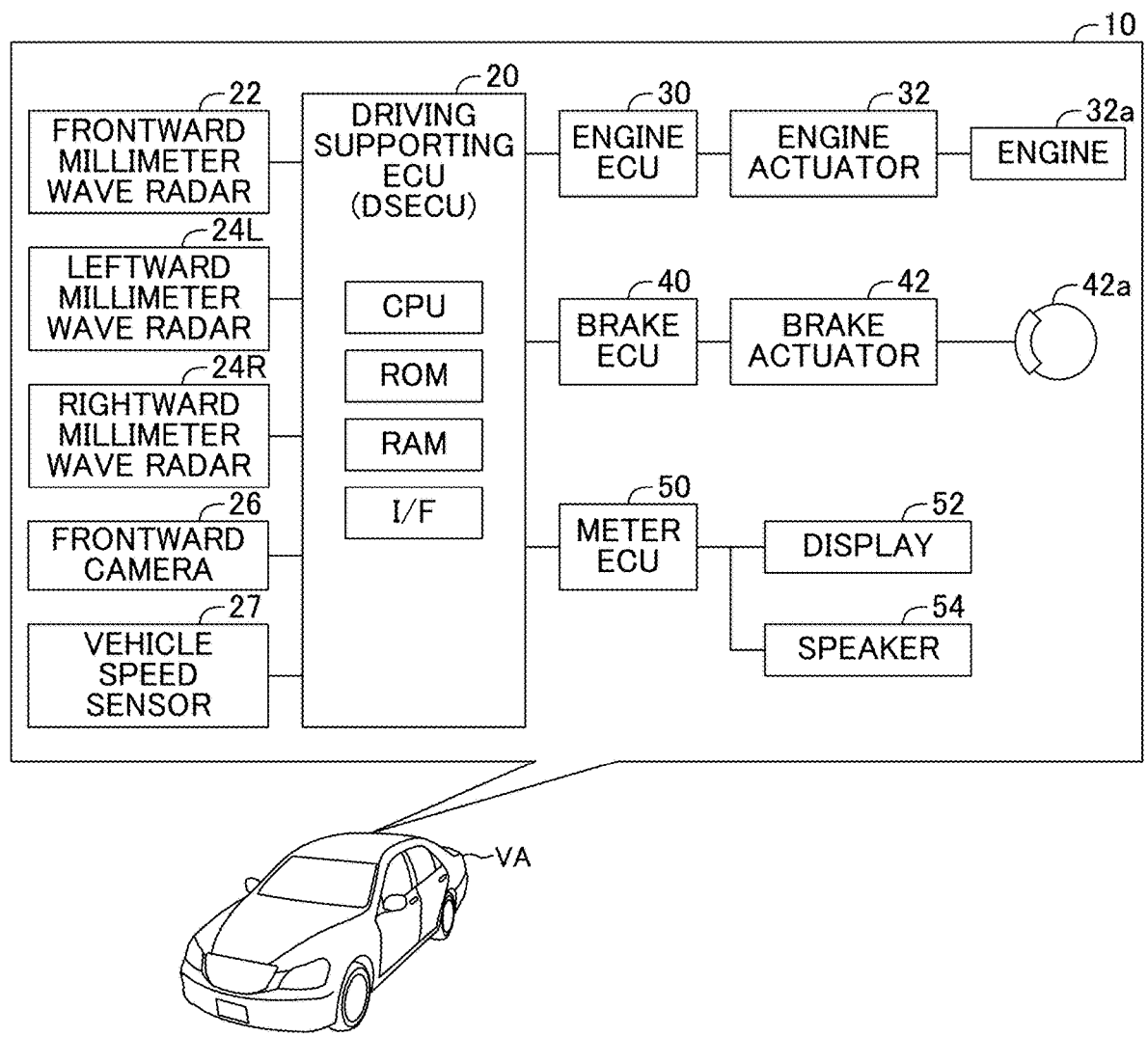
FIG. 1 is a schematic system diagram of a vehicle control apparatus according to an embodiment of the present disclosure.

A vehicle control apparatus (hereinafter, referred to as a "present control apparatus") 10 according to an embodiment of the present disclosure is applied to (or installed in/on) a vehicle VA. As shown in FIG. 1, the present control apparatus 10 comprises a driving supporting ECU (hereinafter, referred to as a "DSECU") 20, an engine ECU 30, a brake ECU 40, and a meter ECU 50.

An "ECU" is an abbreviation of an "Electronic Control Unit" that is an electronic control circuit including a microcomputer as a main component. The microcomputer includes a CPU (processor), a ROM, a RAM, and an interface (I/F). The ECU may sometimes be referred to as a "control unit/section", a "controller", or a "computer". The CPU is configured and/or programmed to realize various functions by executing instructions (routines/programs) stored in a memory (the ROM). Some or all of the above-described ECU 20, 30, 40, and 50 may be integrated into a single ECU.

The present control apparatus 10 comprises a frontward millimeter wave radar 22, a leftward millimeter wave radar 24L, a rightward millimeter wave radar 24R, a frontward camera 26, and a vehicle speed sensor 27. These are connected with the DSECU 20 in such a manner that each of them can exchange data with the DSECU 20.

Hereinafter, when the frontward millimeter wave radar 22, the leftward millimeter wave radar 24L, and the rightward millimeter wave radar 24R need not be differentiated from each other, each of the radars is referred to as a "millimeter wave radar". When the leftward millimeter wave radar 24L and the rightward millimeter wave radar 24R need not be differentiated from each other, each of the radars is referred to as a "sideward millimeter wave radar".

In addition, the leftward millimeter wave radar 24L and the rightward millimeter wave radar 24R may sometimes be referred to as a "sideward (or lateral) detection section". The frontward millimeter wave radar 22 and the frontward camera 26 may sometimes be referred to as a "frontward detection section".

Furthermore, the frontward millimeter wave radar 22 may sometimes be referred to as a "first radar sensor". Each of the leftward millimeter wave radar 24L and the rightward millimeter wave radar 24R may sometimes be referred to as a "second radar sensor".

The millimeter wave radar detects an object by radiating (transmitting) a millimeter wave and receiving a reflection wave of the radiated millimeter wave. The millimeter wave radar obtains/specifies a distance D to the object, a lateral position y of the object, and a relative speed Vr (refer to FIG. 5) of the object, and transmits radar object information including the distance D, the lateral position y, and the relative speed Vr to the DSECU 20.

Figure 2:
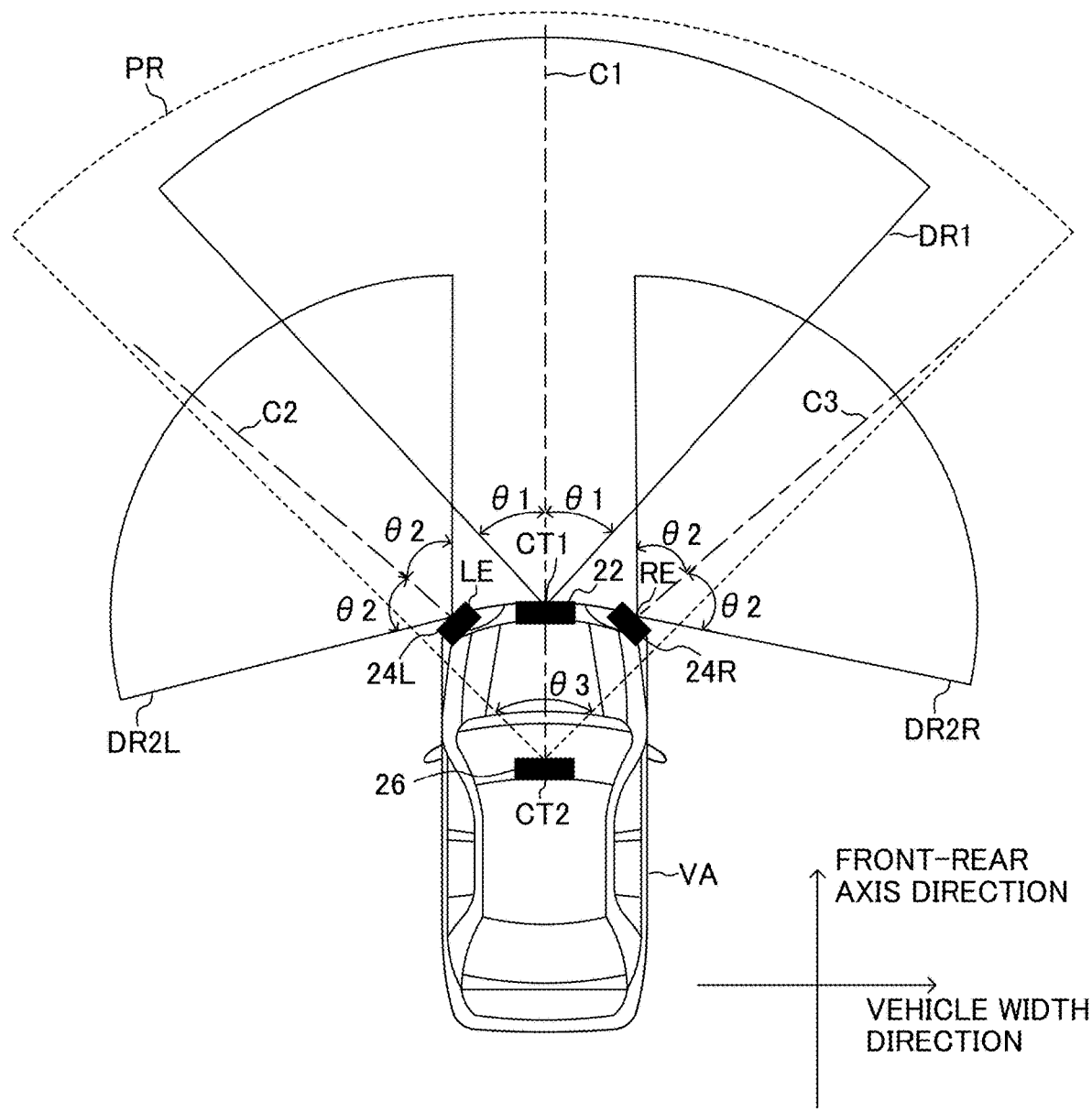
FIG. 2 is a drawing for showing disposed positions of a frontward millimeter wave radar, a leftward millimeter wave radar, a rightward millimeter wave radar, and a frontward camera, shown in FIG. 1, and for describing detection areas and an imaging area of those.

As shown in FIG. 2, the frontward millimeter wave radar 22 is arranged/disposed at a center position CT1 in a vehicle width direction of a front end of the vehicle VA. The frontward millimeter wave radar 22 receives the millimeter wave reflected by an object (3D object) that is present/located in a detection area DR1 in front of the vehicle VA so as to detect the object. The detection area DR1 is a sectoral area that has a center axis C1, and has an angle θ1 from the center axis C1 leftward and the angle θ1 from the center axis C1 rightward. The center axis C1 extends frontward from the center position CT1 along/in a front-rear axis direction of the vehicle VA. In the present example, the angle θ1 is 45 degrees.

As shown in FIG. 2, the leftward millimeter wave radar 24L is arranged/disposed at a left end position LE in the vehicle width direction of the front end of the vehicle VA. The leftward millimeter wave radar 24L detects an object that is present/located in a detection area DR2L that is located at a front left side of the vehicle VA. The detection area DR2L is a sectoral area that has a center axis C2, and has an angle θ2 from the center axis C2 leftward and the angle θ2 from the center axis C2 rightward. The center axis C2 extends from the left end position LE obliquely/diagonally forward left of the vehicle VA.

As shown in FIG. 2, the rightward millimeter wave radar 24R is arranged/disposed at a right end position RE in the vehicle width direction of the front end of the vehicle VA. The rightward millimeter wave radar 24R detects an object that is present/located in a detection area DR2R that is located at a front right side of the vehicle VA. The detection area DR2R is a sectoral area that has a center axis C3, and has the angle θ2 from the center axis C3 leftward and the angle θ2 from the center axis C3 rightward. The center axis C3 extends from the right end position RE obliquely/diagonally forward right of the vehicle VA.

It should be noted that, when the detection area DR2L and the detection area DR2R need not be differentiated from each other, each of them is referred to as a "sideward detection area". An object that is detected by either the leftward millimeter wave radar 24L or the rightward millimeter wave radar 24R may sometimes be referred to as a "sideward object". The angle θ2 of the detection area DR2L of the leftward millimeter wave radar 24L may be equal to or different from the angle θ2 of the detection area DR2R of the rightward millimeter wave radar 24R.

As shown in FIG. 2, the frontward camera 26 is arranged/disposed at an upper center position CT2 in the vehicle width direction of a front windshield of the vehicle VA. The frontward camera 26 obtains a taken image by taking a picture of an imaging area PR in front of the vehicle VA. The frontward camera 26 specifies a distance D to an object included in the taken image and a lateral position (y) of the object based on the taken image, and transmits camera object information including the distance D and the lateral position (y) to the DSECU 20. The imaging area PR is a sectoral area whose center axis extends from the center position CT2 frontward in the front-rear axis direction of the vehicle VA and whose center angle is θ3.

The vehicle speed sensor 27 detects/measures a vehicle speed Vs indicative of a speed of the vehicle VA so as to generate a measured signal indicative of the vehicle speed Vs. The DSECU 20 obtains the vehicle speed Vs based on the measured signal of the vehicle speed sensor 27.

The engine ECU 30 is connected to an engine actuator 32. The engine actuator 32 includes a throttle valve actuator that varies a throttle valve opening degree of a throttle valve of an engine 32a. The engine ECU 30 can change a torque generated by the engine 32a by driving the engine actuator 32. The torque generated by the engine 32a is transmitted to unillustrated drive wheels through an unillustrated transmission. It should be noted that the vehicle VA may comprise an electric motor in place of or in addition to the engine 32a, as a vehicle driving source.

The brake ECU 40 is connected to a brake actuator 42. The brake actuator 42 includes a hydraulic circuit. The hydraulic circuit includes a master cylinder, fluid channels through which brake fluid flows, a plurality of valves, a pump, and a motor for driving the pump. The brake actuator 42 is configured to vary/adjust oil pressure of the brake fluid applied to wheel cylinders installed in a brake mechanism 42a, in response to an instruction from the brake ECU 40. The wheel cylinder is operated by the oil pressure to generate a frictional brake force to a wheel.

The meter ECU 50 is connected with a display 52 and a speaker 54. The display 52 is arranged at a position so as to face a driver in a driver's seat. For example, the display 52 is a multi information display. The speaker 54 is disposed inside a cabin of the vehicle VA and generates a buzzer sound.

(Outline of Operation)

Figure 3:
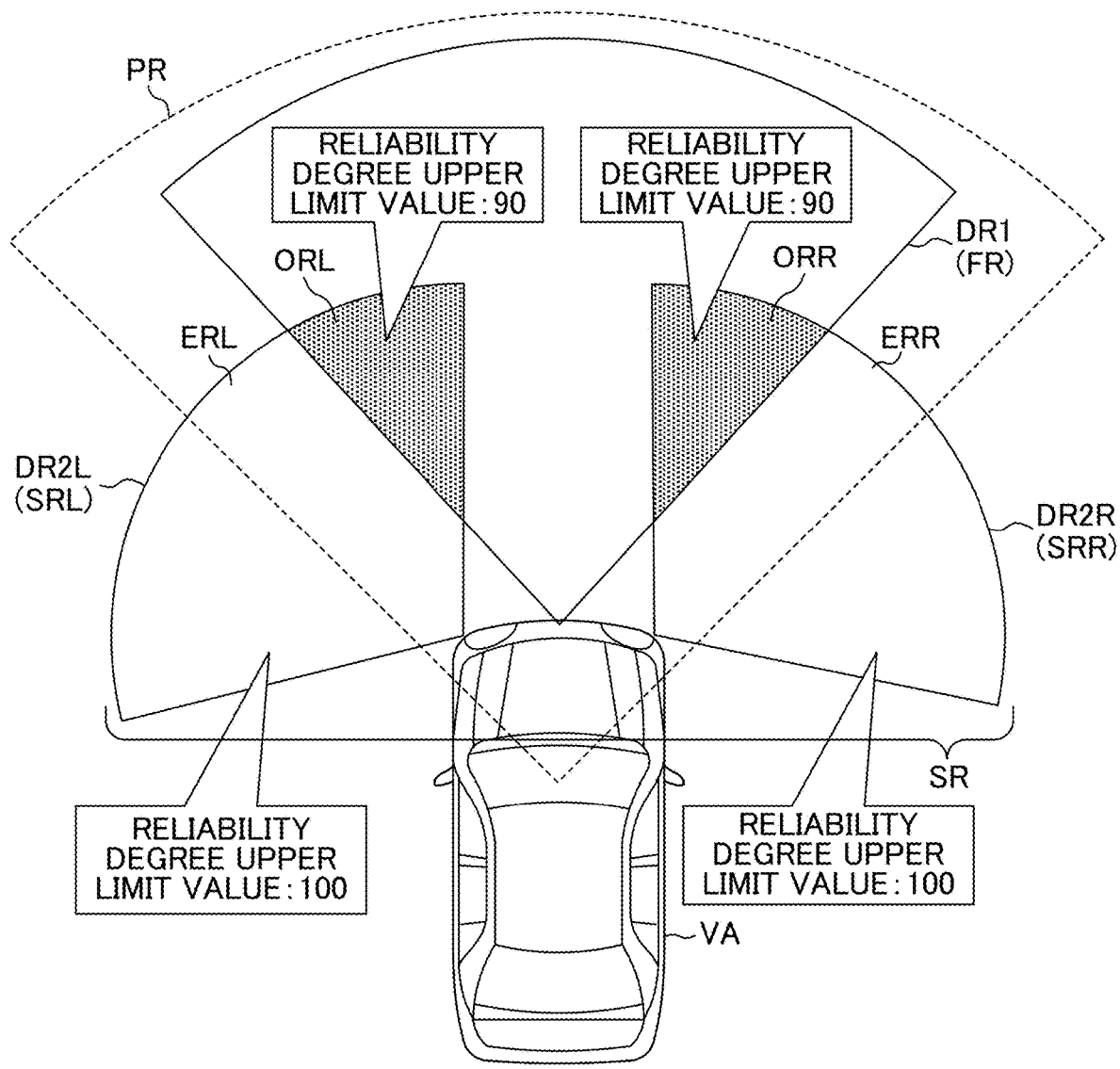
FIG. 3 is a drawing for describing a reliability degree upper limit value for overlapping areas, and a reliability degree upper limit value for non-overlapping areas.

An outline of operation of the present control apparatus 10 will next be described with reference to FIG. 3.

The present control apparatus 10 is configured to be able to perform a front collision avoidance control and a side collision avoidance control.

The front collision avoidance control is a control to avoid a collision (i.e., front collision) between the vehicle VA and the frontward object or to mitigate a damage caused by the collision (i.e., front collision). The side collision avoidance control is a control to avoid a collision (i.e., side collision) between the vehicle VA and the sideward object or to mitigate a damage caused by the collision (i.e., side collision). When the front collision avoidance control and the side collision avoidance control need not be differentiated from each other, each of them may sometimes be referred to as the "collision avoidance control".

The collision avoidance control includes at least one of a notification/warning control and a deceleration control.

The notification control is a control to notify the driver of a high probability of the collision with the frontward object or the sideward object. More specifically, in the notification control, a predetermined notification screen is displayed on the display 52, and/or a buzzer sound is generated from the speaker 54.

The deceleration control is a control to decelerate the vehicle VA in such a manner that a deceleration of the vehicle VA becomes equal to a predetermined target deceleration.

<Front Collision Avoidance Control>

The present control apparatus 10 performs the front collision avoidance control when the following front collision condition becomes satisfied.

The front collision condition: the front collision condition is to be satisfied when a time (hereinafter, referred to as a "TTC") required/taken for the frontward object having a possibility of colliding with the vehicle VA to collide with (reach) the vehicle is equal to or shorter than a predetermined time threshold Tth.

The present control apparatus 10 recognizes (detects) the frontward object through fusing the radar object information (hereinafter, referred to as "frontward radar object information") transmitted by the frontward millimeter wave radar 22 and the camera object information transmitted by the frontward camera 26. This method for recognizing the frontward object will be described later in detail.

It should be noted that the frontward object is an object that is located (present) in a "frontward detection area FR" that is an overlapping area between the detection area DR1 and the imaging area PR. In the present example, as shown in FIGS. 2 and 3, the frontward detection area FR coincides with the detection area DR1, because the imaging area PR includes the detection area DR1.

<Side Collision Avoidance Control>

The present control apparatus 10 performs the side collision avoidance control, when all of the following conditions A1 to A3 become satisfied.

Condition A1: the condition A1 is to be satisfied when a side collision condition becomes satisfied, wherein the side collision condition becomes satisfied when a TTC of the sideward object having a possibility of colliding with the vehicle VA is equal to or shorter than the time threshold Tth.

Condition A2: the condition A2 is to be satisfied when the sideward object is moving.

Condition A3: the condition A3 is to be satisfied when a reliability degree RD of the sideward object is equal to or higher than a predetermined reliability degree threshold RDth.

The sideward object is an object that is located/present in either the detection area DR2L or the detection area DR2R. The detection area DR2L may sometimes be referred to as a "left sideward detection area SRL", and the detection area DR2R may sometimes be referred to as a "right sideward detection area SRR". When the left sideward detection area SRL and the right sideward detection area SRL need not be differentiated from each other, each of the areas is referred to as a "sideward detection area SR".

The reliability degree RD is indicative of (or representing) a possibility (probability) that the sideward object is actually present. The possibility that the sideward object is actually present is higher as the reliability degree RD is higher. A method for obtaining the reliability degree RD will be described later.

<Reliability Degree Upper Limit Value RDL>

The present control apparatus 10 has set an upper limit value (hereinafter, referred to as a "reliability degree upper limit value RDL") of the reliability degree RD for (with respect to) the sideward detection area SR.

More specifically, the present control apparatus 10 has set the reliability degree upper limit value RDL for a left overlapping area ORL between the left sideward detection area SRL and the frontward detection area FR at "90", and has set the reliability degree upper limit value RDL for a left non-overlapping area ERL that is a rest of the left sideward detection area SRL other than the left overlapping area ORL at "100".

Similarly, the present control apparatus 10 has set the reliability degree upper limit value RDL for a right overlapping area ORR between the right sideward detection area SRR and the frontward detection area FR at "90", and has set the reliability degree upper limit value RDL for a right non-overlapping area ERR that is a rest of the right sideward detection area SRR other than the right overlapping area ORR at "100".

When the left overlapping area ORL and the right overlapping area ORR need not be differentiated from each other, each of the areas is referred to as an "overlapping area OR". When the left non-overlapping area ERL and the right non-overlapping area ERR need not be differentiated from each other, each of the areas is referred to as a "non-overlapping area ER".

In the present example, the reliability degree threshold RDth has been set at "95", for example. Thus, when the sideward object is present in the overlapping area OR, the reliability degree RD is less than the reliability degree threshold RDth, and therefore, the present control apparatus 10 does not perform the side collision avoidance control. Whereas, when the sideward object is present in the non-overlapping area ER, the reliability degree RD may become equal to or higher than the reliability degree threshold RDth, and therefore, the present control apparatus 10 may perform the side collision avoidance control. In other words, the present control apparatus 10 suppresses performing the side collision avoidance control in a case where the sideward object is located/present in the overlapping area OR, as compared to a case where the sideward object is located/present in the non-overlapping area ER.

The sideward object is recognized based only/solely on the radar object information, whereas, the frontward object is recognized based on the radar object information and the camera object information. Thus, the recognition accuracy of the sideward object is lower than the recognition accuracy of the frontward object. For example, the present control apparatus 10 may erroneously determine that the sideward object that is stationary (that is not actually moving) is moving. Therefore, the side collision avoidance control for the sideward object recognized based only/solely on the radar object information is more likely to be erroneously performed as compared to a collision avoidance control for an object different from the sideward object.

According to the present control apparatus 10, performing the side collision avoidance control is suppressed in a case where the sideward object is located/present in the overlapping area OR, as compared to a case where the sideward object is located/present in the non-overlapping area ER. This can decrease a possibility that the side collision avoidance control is erroneously performed regarding an object in the overlapping area OR. It should be noted that, if an object that has a high possibility of colliding with the vehicle VA is located/present in the overlapping area OR, the front collision avoidance control is performed for that object.

EXAMPLES OF OPERATION

Examples of operation of the present control apparatus 10 will next be described with reference to FIGS. 4 to 6.

When the vehicle VA travels along a guardrail GR, a reflection point PR on the guardrail GR moves as the vehicle moves.

Figure 4:
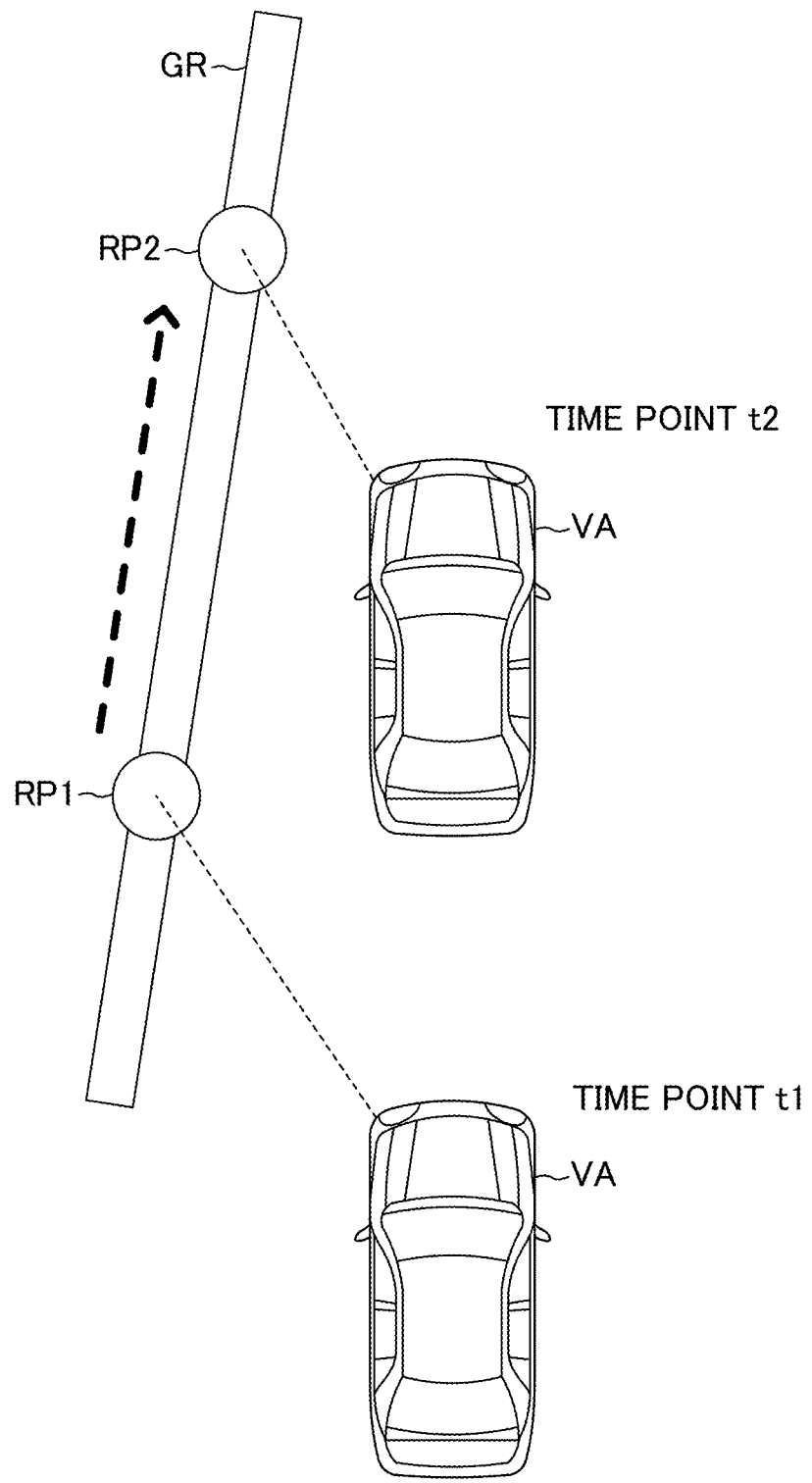
FIG. 4 is a drawing for describing an example where reflection point of a guardrail moves as a vehicle moves.

As shown in FIG. 4, while the vehicle VA is traveling obliquely with respect to the guardrail GR, the leftward millimeter wave radar 24L receives the reflected wave from the reflection point RP1 at a time point t1, and receives the reflected wave from the reflection point RP2 at a time point t2.

Figure 5:
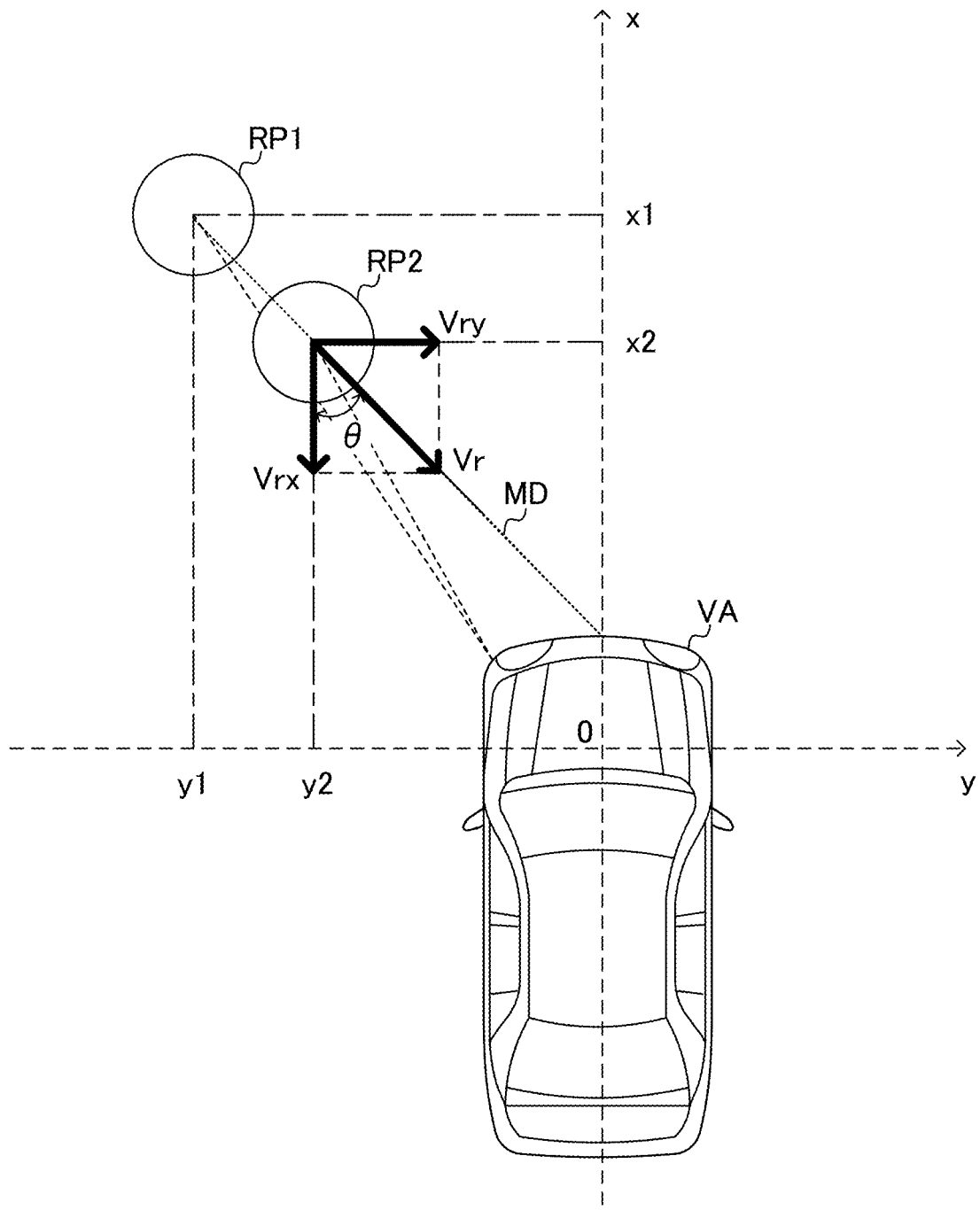
FIG. 5 is a drawing for describing a front-rear axis direction component and a vehicle width direction component of a relative speed of the reflection point shown in FIG. 4.
Figure 6:
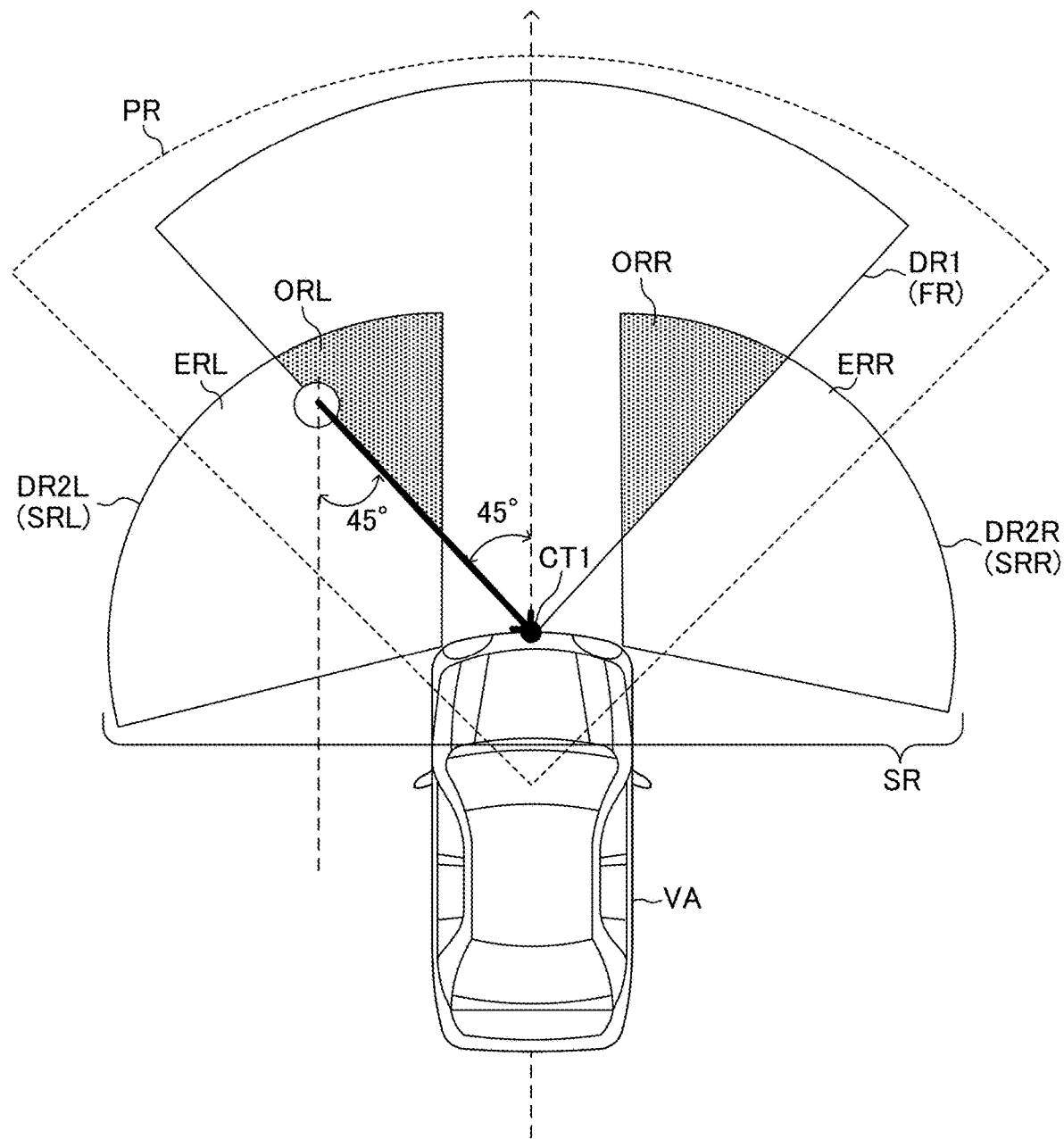
FIG. 6 is a drawing for describing a reason why there is a possibility that an erroneously determined object that is located in the overlapping area collides with the vehicle.

FIG. 5 illustrates a position (hereinafter, referred to as a "relative position") of each of the reflection point RP1 and the reflection point RP2, relative to the vehicle VA. More specifically, in a coordinate system (x, y) having an origin O which is set at a predetermined position on the vehicle VA, the relative position of the reflection point RP1 is represented by a coordinate (x1, y1), and the relative position of the reflection point RP2 is represented by a coordinate (x2, y2).

It should be noted that an X-axis of the coordinate system (x, y) coincides with the front-rear axis direction of the vehicle VA, and a Y-axis of the coordinate system (x, y) coincides with the vehicle width direction of the vehicle VA.

The guardrail GR is a stationary object. Therefore, when the vehicle VA is traveling in parallel to the guardrail GR, a moving direction (hereinafter, referred to as a "relative moving direction") of the reflection point relative to the vehicle VA is parallel to the front-rear axis direction. Thus, the relative moving direction does not include a component that indicates that the reflection point is coming closer to the vehicle VA in the vehicle width direction (y direction). Whereas, as shown in FIG. 5, when the vehicle VA is traveling obliquely with respect to the guardrail GR, the relative moving direction of the reflection point RP2 is a direction MD indicating that the reflection point is obliquely coming closer to the vehicle VA. Namely, the relative moving direction of the reflection point RP2 includes the component indicating that the reflection point is coming closer to the vehicle VA in the vehicle width direction (y direction). Accordingly, it may erroneously be determined that the reflection point RP2 is moving although it is actually stationary, and that the reflection point RP2 is likely to collide with the vehicle VA. An object having such a reflection point RP is referred to as an "erroneously determined object".

A magnitude of a component Vrx (hereinafter, referred to as a "front-rear axis direction component Vrx") in the front-rear axis direction of the relative speed Vr of the erroneously determined object is equal to a magnitude of the vehicle speed Vs. Whereas, a magnitude of a component Vry (hereinafter, referred to as a "vehicle width direction component Vry") in the vehicle width direction of the relative speed Vr of the erroneously determined object is represented by the following expression (1).

$$Vry = Vrx \cdot \tan\theta \quad (1)$$

"$\theta$" in the above expression (1) is an angle $\theta$ formed between the relative moving direction MD and the front-rear axis direction.

When the guardrail GR is orthogonal to a traveling/moving direction of the vehicle VA, the angle $\theta$ is 45 degrees. Therefore, the above-described angle $\theta$ is always equal to or smaller than 45 degrees. Thus, the magnitude of the vehicle width direction component Vry is equal to or smaller than the magnitude of the vehicle speed Vs.

The present control apparatus 10 regards an object having the reflection point that has a vehicle width direction component Vry whose magnitude is equal to or smaller than the magnitude of the vehicle speed Vs as the erroneously determined object.

The above-described angle θ is equal to 45 degrees at a maximum. Thus, as shown in FIG. 6, the erroneously determined object does not collide with the vehicle VA unless the erroneously determined object is present in an area between a left oblique line extending front leftward from the above-described center position CT1 and a right oblique line extending front rightward from the above-described center position CT1. The left oblique line and a center line along/in the front-rear axis direction extending from the above-described center position CT1 intersect with each other at 45 degrees at the center position CT1. The right oblique line and the center line intersect with each other at 45 degrees at the center position CT1. The present control apparatus 10 determines that an object detected by either the sideward detection section or the frontward detection section has a possibility of colliding with the vehicle VA, when an extended line extending in the relative moving direction MD from the object passes through the center position CT1.

Therefore, when the erroneously determined object is located/present in the overlapping area OR, it is determined that the erroneously determined object has a possibility of colliding with the vehicle VA. When the erroneously determined object is located/present in the non-overlapping area ER, it is determined that the erroneously determined object does not have a possibility of colliding with the vehicle VA.

Accordingly, when the erroneously determined object is located/present in the overlapping area OR, there is a possibility that the side collision avoidance control is erroneously performed for that erroneously determined object. Whereas, when the erroneously determined object is located/present in the non-overlapping area ER, there is no possibility that the side collision avoidance control is erroneously performed for that erroneously determined object.

As described above, the present control apparatus 10 suppresses performing the side collision avoidance control in a case where the sideward object is located/present in the overlapping area OR, as compared to a case where the sideward object is located/present in the non-overlapping area ER. This can decrease the possibility that the side collision avoidance control is erroneously performed for the erroneously determined object. When an object having a possibility of colliding with the vehicle VA is located/present in the overlapping area OR, the front collision avoidance control is performed.

(Specific Operation)
<Front Collision Determination Routine>

The CPU of the DSECU 20 (hereinafter, the "CPU" means the CPU of the DSECU 20 unless otherwise specified) is configured or programmed to execute a front collision determination routine shown by a flowchart in FIG. 7 every time a predetermined time elapses.

Figure 7:
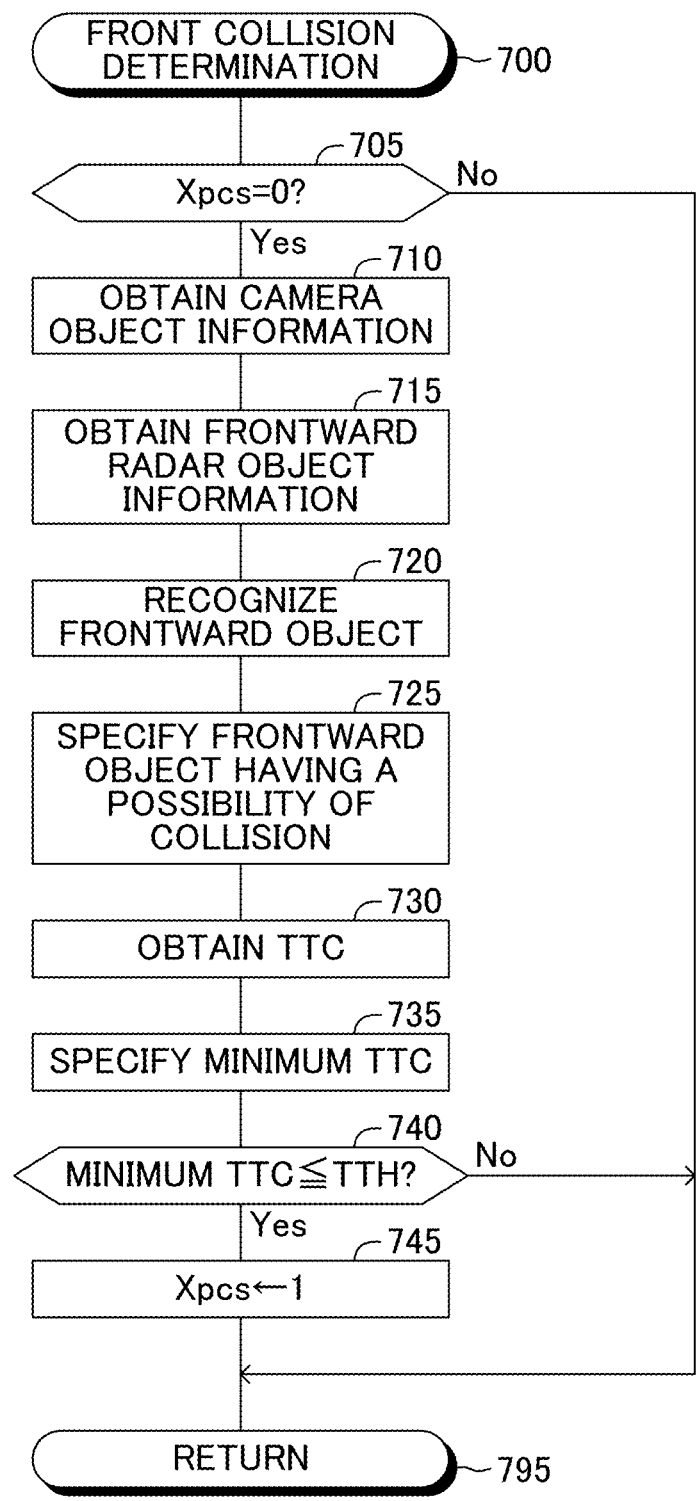
FIG. 7 is a flowchart illustrating a front collision determination routine executed by a CPU of a driving supporting ECU shown in FIG. 1.

When an appropriate time point comes, the CPU starts processing from step 700 in FIG. 7, and proceeds to step 705. At step 705, the CPU determines whether or not a value of a control flag Xpcs is "0".

The value of the control flag Xpcs is set to "1" when either the front collision avoidance control or the side collision avoidance control is being performed, and is set to "0" when neither the front collision avoidance control nor the side collision avoidance control is being performed.

When the value of the control flag Xpcs is "0", the CPU makes a "Yes" determination at step 705, and sequentially executes the processes of step 710 to step 740.

Step 710: the CPU obtains the camera object information from the frontward camera 26.

Step 715: the CPU obtains the frontward radar object information from the frontward millimeter wave radar 22.

Step 720: the CPU recognizes the frontward object(s) based on the camera object information and the frontward radar object information.

More specifically, the CPU determines/specifies an object region enclosing the frontward object based on the camera object information. When at least a part of a group of the reflection points is within the object region, the CPU recognizes that the object in the object region is the same as an object that has the group of the reflection points.

Thereafter, the CPU adopts a distance D included in the frontward radar object information as a distance D to the frontward object, and adopts a lateral position y included in the camera object information as a lateral position y of the frontward object. In addition, the CPU adopts a relative speed Vr included in the frontward radar object information as a relative speed Vr of the frontward object.

Step 725: the CPU specifies the frontward object(s) that has(have) a possibility of colliding with the vehicle VA.

More specifically, the CPU determines that the frontward object has the possibility of colliding with the vehicle VA when a line extending along/in the relative moving direction of the frontward object passes through the center position CT1.

Step 730: the CPU obtains the TTC of each of the frontward objects having the possibility of colliding with the vehicle VA, by dividing the distance D by the relative speed Vr.

Step 735: the CPU selects the TTC that is minimum (i.e., selects a minimum TTC among the TTCs).

Step 740: the CPU determines whether or not the selected minimum TTC is equal to or shorter than the time threshold Tth.

When the selected minimum TTC is longer than the time threshold Tth, the CPU makes a "No" determination at step 740, and proceeds to step 795 to terminate the present routine tentatively.

Whereas, when the selected minimum TTC is equal to or shorter than the time threshold Tth, the CPU makes a "Yes" determination at step 740, and proceeds to step 745. At step 745, the CPU sets the value of the control flag Xpcs to "1". Thereafter, the CPU proceeds to step 795 to terminate the present routine tentatively.

If the value of the control flag Xpcs is "1" when the CPU proceeds to step 705, the CPU makes a "No" determination at step 705, and proceeds to step 795 to terminate the present routine tentatively.

<Side Collision Determination Routine>

Figure 8:
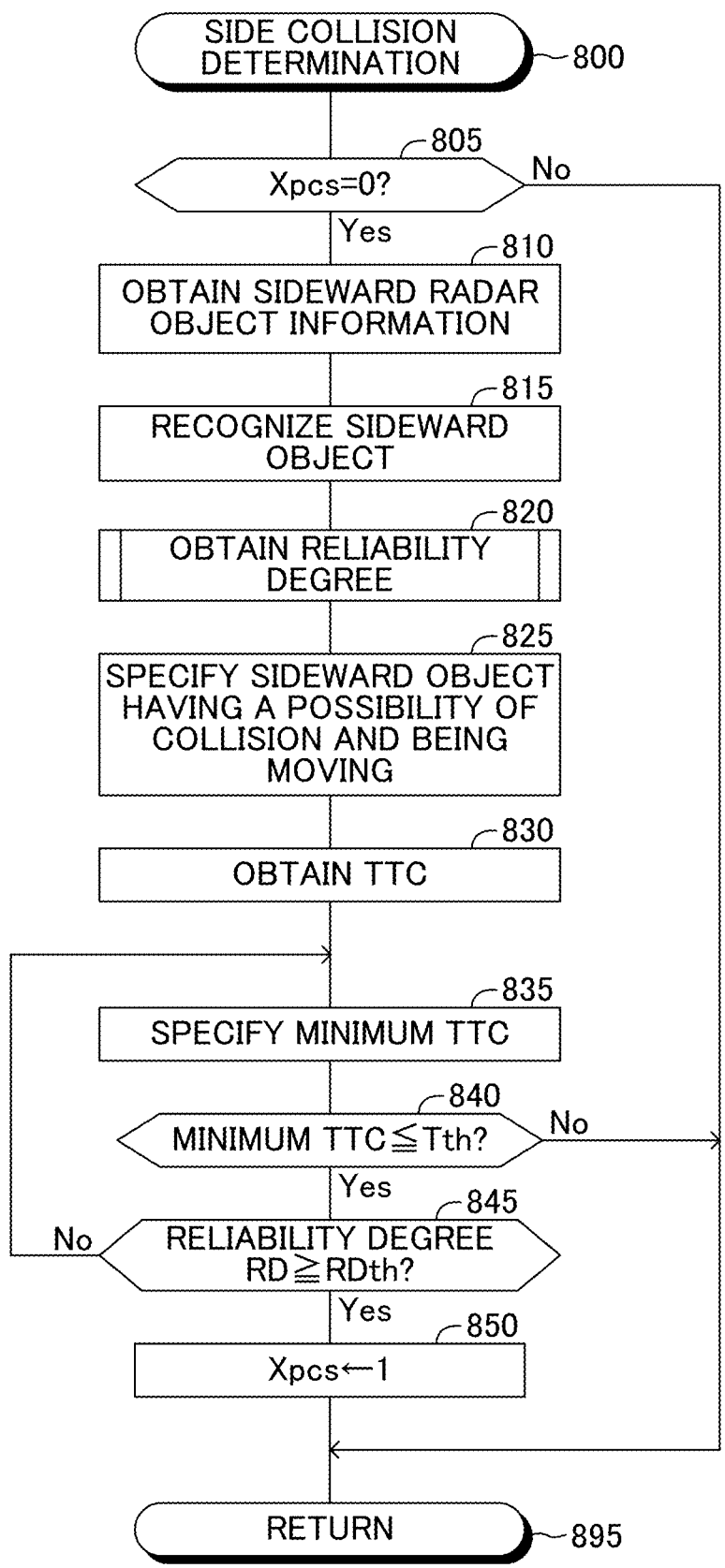
FIG. 8 is a flowchart illustrating a side collision determination routine executed by the CPU of the driving supporting ECU shown in FIG. 1.

The CPU is configured or programmed to execute a side collision determination routine shown by a flowchart in FIG. 8 every time a predetermined time elapses.

When an appropriate time point comes, the CPU starts processing from step 800 in FIG. 8, and proceeds to step 805. At step 805, the CPU determines whether or not the value of the control flag Xpcs is "0".

When the value of the control flag Xpcs is "0", the CPU makes a "Yes" determination at step 805, and sequentially executes the processes of step 810 to step 840.

Step 810: the CPU obtains the radar object information (hereinafter, referred to as "sideward radar object information") from the sideward millimeter wave radar.

Step 815: the CPU obtains "the distance D, the lateral position y, and the relative speed Vr" of the sideward object to recognize the sideward object.

Step 820: the CPU executes a reliability degree obtaining sub routine for obtaining the reliability degree RD. The reliability degree obtaining sub routine will be described later with reference to FIG. 9.

Step 825: the CPU specifies a sideward object(s) that has (have) a possibility of colliding with the vehicle VA and is moving.

A method for determining the possibility of colliding with the vehicle VA used at step 825 is the same as the method used at step 725, and therefore, the description thereof is omitted.

The CPU determines that the sideward object is moving, when a magnitude of the relative speed Vr is greater than the magnitude of the vehicle speed Vs.

Step 830: the CPU obtains the TTC of each of the sideward objects having the possibility of colliding with the vehicle VA and being moving.

Step 835: the CPU selects the TTC that is minimum (i.e., selects a minimum TTC among the TTCs).

Step 840: the CPU determines whether or not the selected minimum TTC is equal to or shorter than the time threshold Tth.

When the selected minimum TTC is longer than the time threshold Tth, the CPU makes a "No" determination at step 840, and proceeds to step 895 to terminate the present routine tentatively.

Whereas, when the selected minimum TTC is equal to or shorter than the time threshold Tth, the CPU makes a "Yes" determination at step 840, and proceeds to step 845. At step 845, the CPU determines whether or not the reliability degree RD of the sideward object having the selected minimum TTC is equal to or higher than the reliability degree threshold RDth.

When the reliability degree RD is lower than the reliability degree threshold RDth, the CPU makes a "No" determination at step 845, and proceeds to step 835. At step 835, the CPU selects another TTC that is the smallest next to the currently selected minimum TTC, and proceeds to step 840.

Whereas, when the reliability degree RD is equal to or higher than the reliability degree threshold RDth, the CPU makes a "Yes" determination at step 845, and proceeds to step 850. At step 850, the CPU sets the value of the control flag Xpcs to "1". Thereafter, the CPU proceeds to step 895 to terminate the present routine tentatively.

If the value of the control flag Xpcs is "1" when the CPU proceeds to step 805, the CPU makes a "No" determination at step 805, and proceeds to step 895 to terminate the present routine tentatively.

<Reliability Degree Obtaining Sub Routine>

Figure 9:
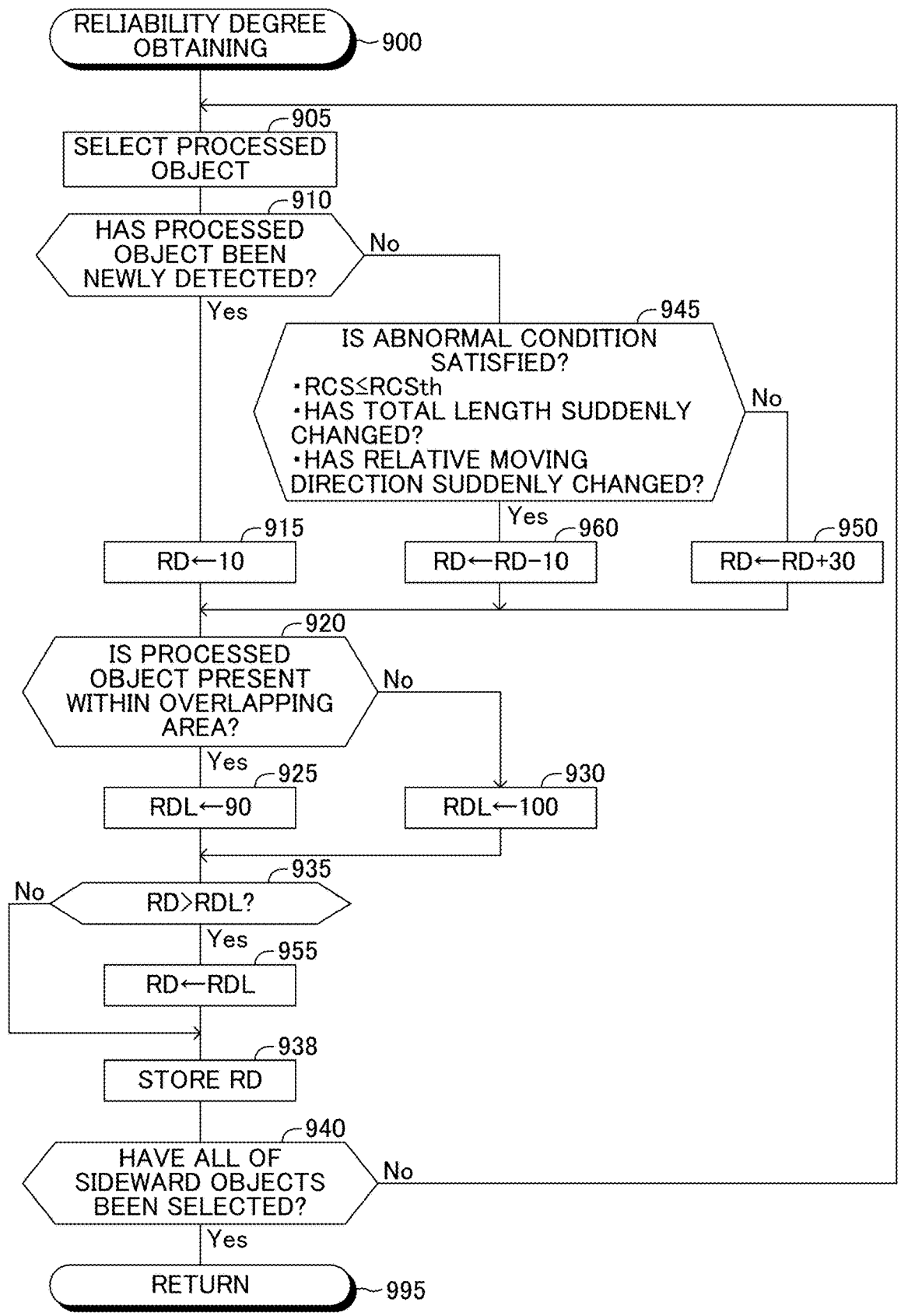
FIG. 9 is a flowchart illustrating a reliability degree obtaining sub routine executed by the CPU of the driving supporting ECU shown in FIG. 1.

The CPU executes the reliability degree obtaining sub routine shown by a flowchart in FIG. 9, when the CPU proceeds to step 820 shown in FIG. 8. Namely, when the CPU proceeds to step 820 shown in FIG. 8, the CPU starts processing from step 900 shown in FIG. 9, and sequentially executes the processes of step 905 and step 910.

Step 905: the CPU selects one of the sideward objects among the sideward objects, as a processed object.

Step 910: the CPU determines whether or not the processed object is an object that has been newly detected.

When the processed object is an object that has been newly detected, the CPU makes a "Yes" determination at step 910, and sequentially executes the processes of step 915 and step 920.

Step 915: the CPU sets the reliability degree RD to "10".

Step 920: the CPU determines whether or not the processed object is located/present within the overlapping area OR.

When the processed object is located/present within the overlapping area OR, the CPU makes a "Yes" determination at step 920, and proceeds to step 925. At step 925, the CPU sets the reliability degree upper limit value RDL to "90".

Whereas, when the processed object is not located/present within the overlapping area OR (namely, when the processed object is located/present within the non-overlapping area ER), the CPU makes a "No" determination at step 920, and proceeds to step 930. At step 930, the CPU sets the reliability degree upper limit value RDL to "100".

Thereafter, the CPU proceeds to step 935 and determines whether or not the reliability degree RD is greater than the reliability degree upper limit value RDL.

When the reliability degree RD is equal to or smaller than the reliability degree upper limit value RDL, the CPU makes a "No" determination at step 935, and sequentially executes the processes of step 938 and step 940.

Step 938: the CPU stores the reliability degree RD of the processed object into the RAM.

Step 940: the CPU determines whether or not all of the sideward objects have been selected as the processed object.

If any one of the sideward objects has not been selected as the processed object yet, the CPU makes a "No" determination at step 940, and returns to step 905 so as to select another new processed object.

When the CPU proceeds to step 910 and if the processed object is not the object that has been newly detected, the CPU makes a "No" determination at step 910, and proceeds to step 945. At step 945, the CPU determines whether or not an abnormal condition is satisfied. More specifically, the CPU determines that the abnormal condition is satisfied when at least one of the following conditions B1 to B3 is satisfied.

Condition B1: The condition B1 is a condition to be satisfied when an RCS (Radar cross-section) is equal to or smaller than a threshold RCSth.

The RCS represents a degree of an ability of reflecting the millimeter wave that an object has. As the RCS of an object is smaller, a detectable distance to an object by a millimeter wave radar is shorter. For example, if an object whose detectable distance is extremely short is detected as the sideward object, it is likely that the sideward object is erroneously detected. This is the reason why the condition B1 is provided as one of the conditions that causes the abnormal condition to be satisfied.

Condition B2: The condition B2 is a condition to be satisfied when a magnitude of a difference between a current total length of the processed object and a previous total length of the processed object is equal to or greater than a threshold. The current total length is a total length of the processed object that has been currently detected. The previous total length is a total length of the processed object that was previously detected.

When the magnitude of the difference regarding the total length is equal to or greater than the threshold, a possibility that the processed object that has been currently detected is the same as the processed object that was previously detected is low, and a possibility that the processed object that has been currently detected is an erroneously detected object is high. This is the reason why the condition B2 is provided as one of the conditions that causes the abnormal condition to be satisfied.

Condition B3: The condition B3 is a condition to be satisfied when a magnitude of a difference between a first angle θ1 and a second angle θ2 is equal to or greater than a threshold. The first angle θ1 is an angle formed between the relative moving direction MD of the processed object that has been currently detected and the front-rear axis direction of the vehicle VA. The second angle θ2 is an angle formed between the relative moving direction MD of the processed object that was previously detected and the front-rear axis direction of the vehicle VA.

When the magnitude of the difference between the first angle θ1 and the second angle θ2 is equal to or greater than the threshold, it can be determined that the relative moving direction has drastically changed. Thus, in this case, a possibility that the processed object that has been currently detected is the same as the processed object that was previously detected is low, and a possibility that the processed object that has been currently detected is an erroneously detected object is high. This is the reason why the condition B3 is provided as one of the conditions that causes the abnormal condition to be satisfied.

It should be noted that the CPU may determine that the abnormal condition is satisfied, when at least one of the following conditions B4 and B5 is satisfied.

Condition B4: The condition B4 is a condition to be satisfied when a micro wave Doppler is detected.

Condition B5: The condition B5 is a condition to be satisfied when a probability indicating that the processed object is a pedestrian is equal to or smaller than a threshold.

When the abnormal condition is not satisfied, the CPU makes a "No" determination at step 945, and proceeds to step 950. At step 950, the CPU adds "30" to the reliability degree RD, and executes processes of step 920 and steps following the step 920.

If the reliability degree RD is greater than the reliability degree upper limit value RDL when the CPU proceeds to step 935, the CPU makes a "Yes" determination at step 935, and proceeds to step 955. At step 955, the CPU sets the reliability degree to the reliability degree upper limit value RDL. Thereafter, the CPU proceeds to step 938.

On the other hand, if the abnormal condition is satisfied when the CPU proceeds to step 945, the CPU makes a "Yes" determination at step 945, and proceeds to step 960. At step 960, the CPU subtract "10" from the reliability degree RD, and proceeds to step 920.

If all of the sideward objects have been selected as the processed object when the CPU proceeds to step 940, the CPU makes a "Yes" determination at step 940, and proceeds to step 995 to terminate the present routine tentatively. Thereafter, the CPU proceeds to step 825 shown in FIG. 8.

<Collision Avoidance Control Routine>

Figure 10:
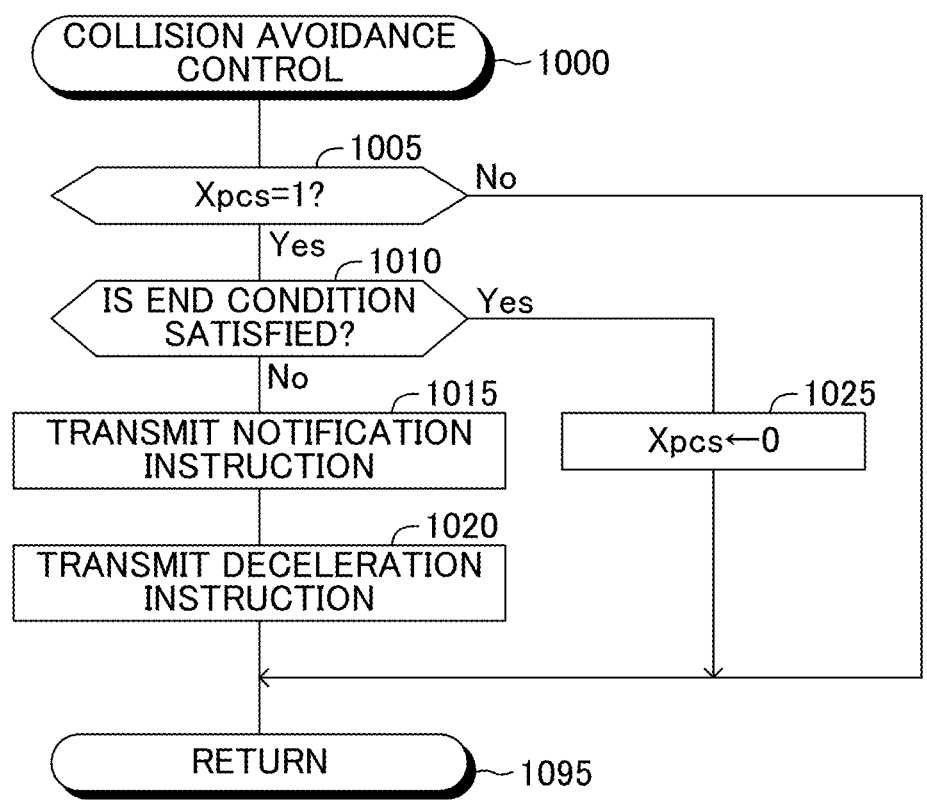
FIG. 10 is a flowchart illustrating a collision avoidance control routine executed by the CPU of the driving supporting ECU shown in FIG. 1.

The CPU is configured or programmed to execute a collision avoidance control routine shown by a flowchart in FIG. 10 every time a predetermined time elapses.

When an appropriate time point comes, the CPU starts processing from step 1000 in FIG. 10, and proceeds to step 1005. At step 1005, the CPU determines whether or not the value of the control flag Xpcs is "1".

When the value of the control flag Xpcs is "0", the CPU makes a "No" determination at step 1005, and the CPU proceeds to step 1095 to terminate the present routine tentatively.

When the value of the control flag Xpcs is "1", the CPU makes a "Yes" determination at step 1005, and the CPU proceeds to step 1010. At step 1010, the CPU determines whether or not an end condition of the collision avoidance control is satisfied. More specifically, the CPU determines that the end condition is satisfied when at least one of the following conditions C1 and C2 is satisfied.

Condition C1: The condition C1 is a condition to be satisfied when an operation rate of an unillustrated steering wheel by the driver is equal to or higher than a rate threshold.

Condition C2: The condition C2 is a condition to be satisfied when an operation amount of an unillustrated acceleration pedal by the driver is equal to or higher than an operation amount threshold, and an operation rate of the acceleration pedal is equal to or higher than an operation rate threshold.

When the end condition is not satisfied, the CPU makes a "No" determination at step 1010, and sequentially executes the processes of step 1015 and step 1020.

Step 1015: the CPU transmits a notification instruction to the meter ECU 50.

When the meter ECU 50 receives the notification instruction, the meter ECU 50 displays the notification screen on the display 52, and causes the speaker 54 to generate the buzzer sound.

Step 1020: the CPU transmits a deceleration instruction including a predetermined target deceleration to the engine ECU 30 and the brake ECU 40.

When the engine ECU 30 receives the deceleration instruction, the engine ECU 30 controls the engine actuator 32 in such a manner that the deceleration of the vehicle VA becomes equal to the target deceleration. When the brake ECU 40 receives the deceleration instruction, the brake ECU 40 controls the brake actuator 42 in such a manner that the deceleration of the vehicle VA becomes equal to the target deceleration.

Thereafter, the CPU proceeds to step 1095 to terminate the present routine tentatively.

Whereas, if the end condition is satisfied when the CPU proceeds to step 1010, the CPU makes a "Yes" determination at step 1010, and proceeds to step 1025. At step 1025, the CPU sets the value of the control flag Xpcs to "0". Thereafter, the CPU proceeds to step 1095 to terminate the present routine tentatively.

As understood from the above descriptions, the present control apparatus 10 suppresses performing the side collision avoidance control in a case where the sideward object is located/present in the overlapping area OR, as compared to a case where the sideward object is located/present in the non-overlapping area ER. Therefore, in the case where the sideward object is located/present in the overlapping area OR, the side collision avoidance control performed based on the sideward detection section (24L, 24R) having the recognition accuracy of an object that is lower than the recognition accuracy of an object that the frontward detection section (22, 26) has is suppressed. This can decrease a possibility that the side collision avoidance control is erroneously performed when the object is located/present in the overlapping area OR.

The present disclosure should not be limited to the above-described embodiment, and may employ various modifications within the scope of the present disclosure.

First Modification

In the present modification, the front collision avoidance control may be different from the side collision avoidance control. For example, the CPU may perform both of the notification control and the deceleration control in the front collision avoidance control, whereas the CPU may perform the notification control only in the side collision avoidance control.

Second Modification

In the present modification, even in the case where the TTC is equal to or shorter than the time threshold Tth, the side collision avoidance control is not performed when the magnitude of the vehicle width direction component Vry of the sideward object is equal to or smaller than the magnitude of the vehicle speed Vs, whereas the side collision avoidance control is performed when the magnitude of the vehicle width direction component Vry of the sideward object is larger than the magnitude of the vehicle speed Vs. This can further decrease the possibility that the side collision avoidance control is erroneously performed for the erroneously determined object.

Figure 11:
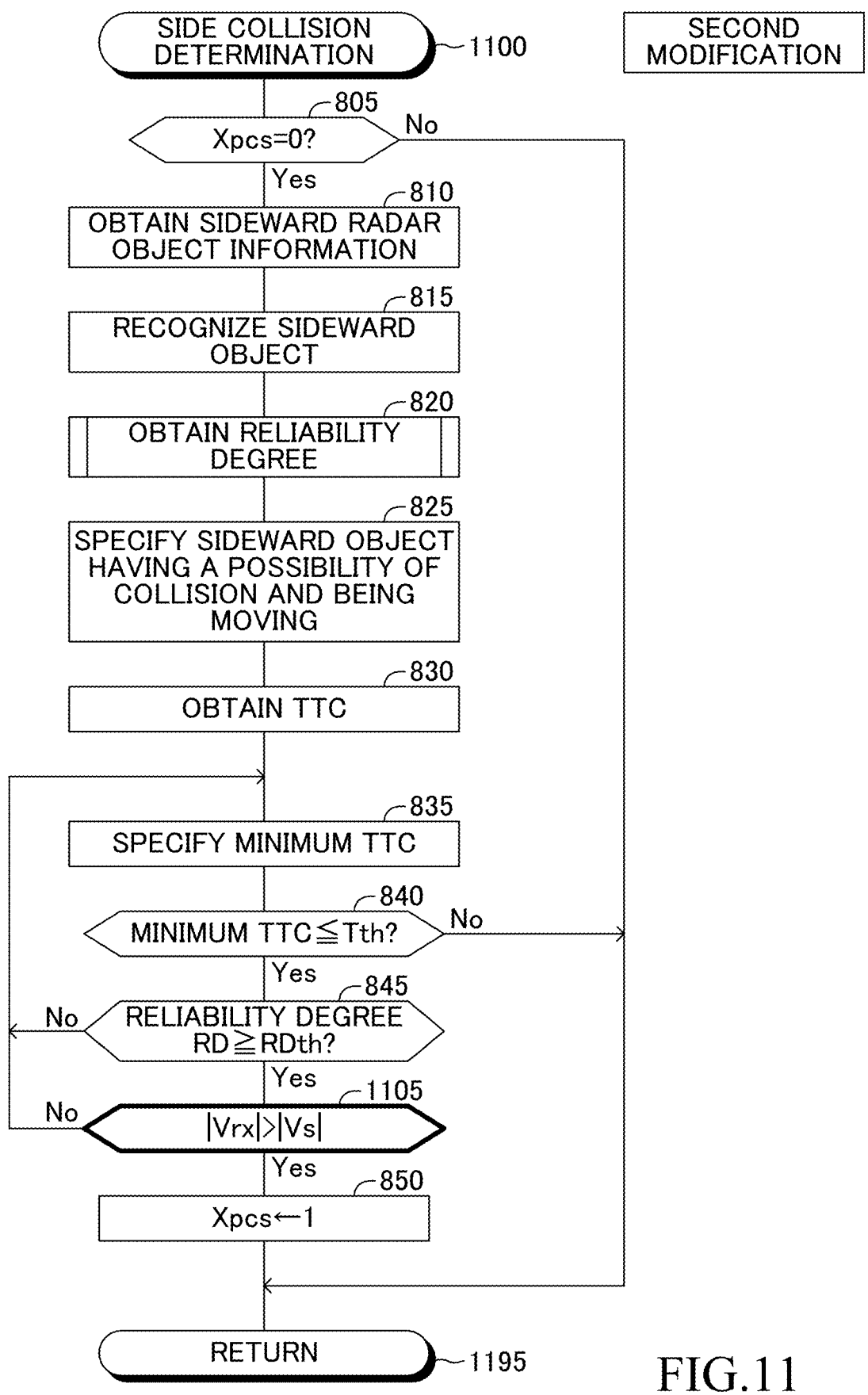
FIG. 11 is a flowchart illustrating a side collision determination routine executed by a CPU of a driving supporting ECU of a second modification of the embodiment according to the present disclosure.

The CPU of the DSECU 20 in accordance with the present modification is configured or programmed to execute a side collision determination routine shown by a flowchart in FIG. 11 in place of the routine shown in FIG. 8, every time a predetermined time elapses. It should be noted that steps in the routine shown by the flowchart in FIG. 11 that are the same as the steps shown in FIG. 8 are given reference symbols of the respective steps shown in FIG. 8, and the descriptions thereof may be omitted.

When an appropriate time point comes, the CPU starts processing from step 1100 in FIG. 11, and proceeds to step 805. When the CPU makes a "Yes" determination at step 805 shown in FIG. 11, the CPU sequentially executes the processes of "step 810 to step 840" shown in FIG. 11.

When the minimum TTC is equal to or shorter than the time threshold Tth and the reliability degree RD is equal to or greater than the reliability degree threshold RDth, the CPU makes a "Yes" determination at step 840 shown in FIG. 11, makes a "Yes" determination at step 845 shown in FIG. 11, and proceeds to step 1105.

At step 1105, the CPU determines whether or not the magnitude of the vehicle width direction component Vry is greater than the magnitude of the vehicle speed Vs.

When the magnitude of the vehicle width direction component Vry is greater than the magnitude of the vehicle speed Vs, the CPU makes a "Yes" determination at step 1105, and sets the value of the control flag Xpcs to "1" at step 850 shown in FIG. 11. Thereafter, the CPU proceeds to step 1195 to terminate the present routine tentatively.

Whereas, when the magnitude of the vehicle width direction component Vry is equal to or smaller than the magnitude of the vehicle speed Vs, the CPU makes a "No" determination at step 1105, and returns to step 835 shown in FIG. 11.

Third Modification

The CPU of the DSECU 20 in the present modification may be configured to suppress the execution of the side collision avoidance control by setting the time threshold Tth for the sideward object that is located in the overlapping area OR to a value shorter/smaller than a value of the time threshold Tth for the sideward object that is located in the non-overlapping area ER.

In addition, the CPU of the DSECU 20 in the present modification may be configured to suppress the execution of the side collision avoidance control by comparing a product of the "TTC of the sideward object that is located in the overlapping area OR" and a "weight coefficient α set at a value greater than 1" with the time threshold Tth.

Fourth Modification

The CPU of the DSECU 20 in the present modification may be configured to use a "condition to be satisfied when the distance to the object D becomes equal to or shorter than a distance threshold Dth", in place of the "condition to be satisfied when the TTC becomes equal to or shorter than the time threshold Tth". It should be noted that each of these conditions may sometimes be referred to as a "collision condition". Each of the TTC and the distance D is a collision indication value indicative of a possibility of a collision between the object and the vehicle VA. The collision condition can be any one of conditions as long as the condition becomes satisfied when a relationship between the collision indication value and a predetermined threshold satisfies a "predetermined condition indicating that the possibility of the collision becomes equal to or higher than a threshold".

Fifth Modification

The CPU of the DSECU 20 in the present modification may be configured to subtract a "product of the number of conditions that are satisfied among the conditions B1-B3 and a subtraction value ("10")" from the reliability degree RD, at step 960 shown in FIG. 9.

Alternatively, the different subtraction values may be employed for the conditions B1-B3, respectively.

Sixth Modification

Each of the frontward millimeter wave radar 22, the leftward millimeter wave radar 24L, and the rightward millimeter wave radar 24R may be replaced with a remote sensing sensor configured to detect an object by transmitting a radio wave other than the millimeter wave and receiving a radio wave that is reflected at the object.

Seventh Modification

The present vehicle control apparatus 10 may be applied to (or installed in/on) the internal combustion engine, a hybrid electric vehicle (HEV), a plug-in hybrid electric vehicle (PHEV), a fuel cell electric vehicle (FCEV), and a battery electric vehicle (BEV). The present vehicle control apparatus 10 can also be applied to an autonomous control vehicle.

The present disclosure may include a non-volatile storage device/medium into which a program for realizing the functions of the present vehicle control apparatus 10 is stored and from which the program is read out.

What is claimed is:
1. A vehicle control apparatus comprising:
   a frontward detection section configured to detect, as a frontward object, an object that is located in a frontward detection area that is an area in front of a vehicle;
   a sideward detection section configured to detect, as a sideward object, an object that is located in a sideward detection area that is a side area of said vehicle, said sideward detection area having an overlapping area that is a part of said sideward detection area that overlaps with said frontward detection area; and
   a control section configured to perform a front collision avoidance control to avoid a collision between said frontward object and said vehicle or to mitigate a damage caused by said collision between said frontward object and said vehicle, when said frontward object satisfies a predetermined front collision condition; and configured to perform a side collision avoidance control to avoid a collision between said sideward object and said vehicle or to mitigate a damage caused by said collision between said sideward object and said vehicle, when said sideward object satisfies a predetermined side collision condition, wherein,
recognition accuracy regarding said sideward object of said sideward detection section is lower than recognition accuracy regarding said frontward object of said frontward detection section; and
said control section is configured to suppress performing said side collision avoidance control in a case where said sideward object is located in said overlapping area, as compared to a case where said sideward object is located in a non-overlapping area that is a rest of said sideward detection area other than said overlapping area,
wherein said control section is configured to:
perform said front collision avoidance control when said frontward object satisfies said front collision condition, regardless of whether or not said frontward object is moving; and
perform said side collision avoidance control when said sideward object is moving and said sideward object satisfies said side collision condition, and
said frontward detection section and said sideward detection section are configured to have said overlapping area in such a manner that said overlapping area is an area where an erroneously determined object that is located in said overlapping area has a possibility of colliding with said vehicle, said erroneously determined object being an object having a possibility that it is erroneously determined to be moving although it is stationary, and in such a manner that said non-overlapping area is an area where said erroneously determined object that is located in said non-overlapping area does not have a possibility of colliding with said vehicle.

2. The vehicle control apparatus according to claim 1, wherein,
said control section is configured to:
obtain a reliability degree representing a possibility that said sideward object detected by said sideward detection section is actually present;
perform said side collision avoidance control if said reliability degree of said sideward object is equal to or greater than a predetermined reliability degree threshold, when said sideward object satisfies said side collision condition; and
set an upper limit of said reliability degree of said sideward object that is located in said overlapping area to a value smaller than a value of an upper limit of said reliability degree of said sideward object that is located in said non-overlapping area.

3. The vehicle control apparatus according to claim 1, wherein,
said frontward detection area has been determined in such a manner that said frontward detection area has 45 degrees leftward from a center axis and has 45 degrees rightward from said center axis, said center axis extending frontward along a front-rear axis direction of said vehicle and passing through a center position in a width direction of said vehicle.

4. The vehicle control apparatus according to claim 1, wherein,
said control section is configured to:
determine that said front collision condition becomes satisfied, when a relationship between a front collision indication value indicative of a possibility of a collision between said frontward object and said vehicle and a predetermined frontward threshold satisfies a predetermined condition; and
determine that said side collision condition becomes satisfied, when a relationship between a side collision indication value indicative of a possibility of a collision between said sideward object and said vehicle and a predetermined sideward threshold satisfies a predetermined condition.

5. The vehicle control apparatus according to claim 1, wherein,
said frontward detection section includes a camera and a first radar sensor, and is configured to recognize said frontward object based on an image taken by said camera and a detection result of said first radar sensor; and
said sideward detection section includes a second radar sensor, and is configured to recognize said sideward object based on a detection result of said second radar sensor.

6. A vehicle control method to perform a collision avoidance control to avoid a collision between an object and a vehicle or to mitigate a damage caused by said collision, said method being executed by a computer installed on said vehicle, comprising:
a first step of recognizing a frontward object based on a detection result of a frontward detection section that detects, as said frontward object, an object that is located in a frontward detection area that is an area in front of said vehicle;
a second step of recognizing a sideward object based on a detection result of a sideward detection section that detects, as said sideward object, an object that is located in a sideward detection area that is a side area of said vehicle, said sideward detection area having an overlapping area that is a part of said sideward detection area that overlaps with said frontward detection area;
a third step of performing a front collision avoidance control to avoid a collision between said frontward object and said vehicle or to mitigate a damage caused by said collision between said frontward object and said vehicle, when said frontward object satisfies a predetermined front collision condition; and
a fourth step of performing a side collision avoidance control to avoid a collision between said sideward object and said vehicle or to mitigate a damage caused by said collision between said sideward object and said vehicle, when said sideward object satisfies a predetermined side collision condition,
wherein,
recognition accuracy regarding said sideward object of said sideward detection section is lower than recognition accuracy regarding said frontward object of said frontward detection section;
said vehicle control method further comprises a fifth step of suppressing performing said side collision avoidance control in a case where said sideward object is located in said overlapping area, as compared to a case where said sideward object is located in a non-overlapping area that is a rest of said sideward detection area other than said overlapping area;
a sixth step of performing said front collision avoidance control when said frontward object satisfies said front collision condition, regardless of whether or not said frontward object is moving;
a seventh step of performing said side collision avoidance control when said sideward object is moving and said sideward object satisfies said side collision condition, and said frontward detection section and said sideward detection section are configured to have said overlapping area in such a manner that said overlapping area is an area where an erroneously determined object that is located in said overlapping area has a possibility of colliding with said vehicle, said erroneously determined object being an object having a possibility that it is erroneously determined to be moving although it is stationary, and in such a manner that said non-overlapping area is an area where said erroneously determined object that is located in said non-overlapping area does not have a possibility of colliding with said vehicle.

7. A vehicle control apparatus comprising:

at least one of frontward detection sensors configured to detect, as a frontward object, an object that is located in a frontward detection area that is an area in front of a vehicle;

a sideward detection sensor configured to detect, as a sideward object, an object that is located in a sideward detection area that is a side area of said vehicle, said sideward detection area having an overlapping area that is a part of said sideward detection area that overlaps with said frontward detection area; and a controller configured to recognize said frontward object based on a detection result of said frontward detection sensors and said sideward object based on a detection result of said sideward detection sensor, and perform a front collision avoidance control to avoid a collision between said frontward object and said vehicle or to mitigate a damage caused by said collision between said frontward object and said vehicle, when said frontward object satisfies a predetermined front collision condition; and configured to perform a side collision avoidance control to avoid a collision between said sideward object and said vehicle or to mitigate a damage caused by said collision between said sideward object and said vehicle, when said sideward object satisfies a predetermined side collision condition, wherein, recognition accuracy regarding said sideward object is lower than recognition accuracy regarding said frontward object; and said controller is configured to suppress performing said side collision avoidance control in a case where said sideward object is located in said overlapping area, as compared to a case where said sideward object is located in a non-overlapping area that is a rest of said sideward detection area other than said overlapping area, wherein said controller is configured to:

perform said front collision avoidance control when said frontward object satisfies said front collision condition, regardless of whether or not said frontward object is moving; and perform said side collision avoidance control when said sideward object is moving and said sideward object satisfies said side collision condition, and said frontward detection section and said sideward detection section are configured to have said overlapping area in such a manner that said overlapping area is an area where an erroneously determined object that is located in said overlapping area has a possibility of colliding with said vehicle, said erroneously determined object being an object having a possibility that it is erroneously determined to be moving although it is stationary, and in such a manner that said non-overlapping area is an area where said erroneously determined object that is located in said non-overlapping area does not have a possibility of colliding with said vehicle.

* * * * *